(12) United States Patent
Kato et al.

(10) Patent No.: US 7,398,145 B2
(45) Date of Patent: Jul. 8, 2008

(54) WHEEL GRIP FACTOR ESTIMATING APPARATUS AND VEHICLE MOTION CONTROL APPARATUS

(75) Inventors: Hiroaki Kato, Hekinan (JP); Minekazu Momiyama, Chiryu (JP); Yoshiyuki Yasui, Nagoya (JP); Yuji Muragishi, Nagoya (JP); Yuzo Imoto, Chita-gun (JP); Hiroaki Aizawa, Anjo (JP)

(73) Assignees: Jtekt Corporation, Osaka (JP); Advics Co., Ltd., Kariya-shi (JP)

( * ) Notice: Subject to any disclaimer, the term of this patent is extended or adjusted under 35 U.S.C. 154(b) by 611 days.

(21) Appl. No.: 10/931,982

(22) Filed: Sep. 2, 2004

(65) Prior Publication Data

US 2005/0055149 A1 Mar. 10, 2005

(30) Foreign Application Priority Data

Sep. 5, 2003 (JP) ............................. 2003-314517

(51) Int. Cl.
*G06F 7/00* (2006.01)
(52) U.S. Cl. ......................................... 701/80; 701/73
(58) Field of Classification Search .................. 701/80, 701/73–74; 303/148–149; 105/128
See application file for complete search history.

(56) References Cited

U.S. PATENT DOCUMENTS

| 6,349,789 B1 | 2/2002 | Nakano et al. |
| 6,941,213 B2 * | 9/2005 | Yasui et al. ................... 701/80 |
| 6,952,635 B2 * | 10/2005 | Yasui et al. ................... 701/41 |
| 7,069,135 B2 | 6/2006 | Bertrand |
| 2001/0003810 A1 | 6/2001 | Shinmura et al. |
| 2002/0011093 A1 | 1/2002 | Matsuno |

FOREIGN PATENT DOCUMENTS

| DE | 39 22 528 C1 | 7/1990 |
| EP | 1 275 937 A2 | 1/2003 |
| JP | 62-116355 | 5/1987 |
| JP | 62-146754 | 6/1987 |
| JP | 05-069845 | 3/1993 |
| JP | 6-99800 | 4/1994 |
| JP | 09-048338 | 2/1997 |
| JP | 11-99956 | 4/1999 |
| JP | 11-117784 | 4/1999 |
| JP | 2000-62597 | 2/2000 |
| JP | 2002-012142 | 1/2002 |
| JP | 2003-127888 | 5/2003 |
| JP | 2005-516836 | 6/2005 |

\* cited by examiner

*Primary Examiner*—Yonel Beaulieu
(74) *Attorney, Agent, or Firm*—Oblon, Spivak, McClelland, Maier & Neustadt, P.C.

(57) ABSTRACT

A grip factor estimating apparatus includes a steering torque detecting unit M1, and an assist torque detecting unit M2. When a self-aligning torque estimating unit M6 estimates self-aligning torque generated in front wheels on the basis of detection result of the detecting unit, the quantity of influence of longitudinal force on self-aligning torque is removed on the basis of longitudinal force acting on the front wheels and estimated by a longitudinal force estimating unit M15 and a front wheel slip angle estimated by a front wheel slip angle estimating unit M9y. A grip factor estimating unit M12 estimates the grip factor of the front wheels on the basis of change in self-aligning torque in accordance with the side force.

14 Claims, 20 Drawing Sheets

WHEEL GRIP FACTOR ESTIMATING APPARATUS AND VEHICLE MOTION CONTROL APPARATUS

CROSS-REFERENCE TO THE RELATED APPLICATION(S)

This application is based upon and claims a priority from a prior Japanese Patent Application No. 2003-314517 filed on Sep. 5, 2003, the entire contents of which are incorporated herein by reference.

BACKGROUND OF THE INVENTION

1. Field of the Invention

The present invention relates to an apparatus for estimating the grip factor of wheels and particularly to an apparatus for estimating the grip factor indicating the grip level of wheels in the front of a vehicle in a lateral direction. The invention also relates to a vehicle motion control apparatus equipped with the grip factor estimating apparatus.

2. Description of the Related Art

There is known an apparatus for detecting and judging the state variable of a vehicle and controlling braking force of wheels independently to retain the stability of the vehicle. For example, this type apparatus has been disclosed in JP-A-6-099800. According to the document JP-A-6-099800, a target value of yaw rate is formed on the basis of vehicle velocity and steering angle, so that a judgment is made on the basis of a time derived function of deviation from the actual value of yaw rate as to whether the vehicle is in a state having a tendency to over-steering or a tendency to under-steering. In the case of over-steering, braking slip of front wheels in the outside of turning is increased, that is, braking force of front wheels in the outside of turning is increased. In the case of under-steering, braking slip of rear wheels in the inside of turning is increased. On the other hand, an apparatus for setting a target value of front wheel velocity difference, lateral acceleration or yaw rate on the basis of steering angle and vehicle velocity and controlling a brake and/or engine output has been disclosed in JP-A-62-146754.

Moreover, a variable rudder angle ratio steering apparatus for vehicle to prevent excessive steering of a steering wheel has been disclosed in JP-A-11-099956. An index of lateral force activity ratio or lateral G activity ratio is used in the apparatus. That is, according to the apparatus described in the document JP-A-11-099956, the friction coefficient μ of a road surface is first estimated so that the lateral force activity ratio is calculated. Because cornering power Cp of tires decreases as the friction coefficient μ of the road surface decreases, rack shaft counterforce received from the road surface in a certain rudder angle decreases in accordance with the friction coefficient μ of the road surface. Accordingly, the document JP-A-11-099956 has described that, when the front wheel rudder angle and the rack shaft counterforce are measured actually, the friction coefficient μ of the road surface can be estimated on the basis of comparison between the rack shaft counterforce actually measured relative to the front wheel rudder angle and reference rack shaft counterforce set as an inner model in advance. Moreover, an equivalent friction circle is set on the basis of the friction coefficient μ of the road surface and part of friction force used by longitudinal force is subtracted from the friction force to calculate maximum generated lateral force to thereby define the ratio of currently generated lateral force to the maximum generated lateral force as the lateral force activity ratio. Or the document JP-A-11-099956 has described that a lateral G sensor is provided so that the lateral G activity ratio can be calculated on the basis of lateral G detected by the lateral G sensor.

Because friction between the road surface and each tire is limited, it is necessary not only to control the yawing motion of the vehicle, that is, the posture of the vehicle on a surface on which the vehicle is running, but also to reduce the velocity of the vehicle so that the turning radius intended by the driver can be retained when the vehicle reaches a friction limit and gets into an excessive under-steering state. In the apparatus described in a document "AUTOMOTIVE ENGINEERING HANDBOOK, First Volume, for BASIC & THEORY, issued on Feb. 1, 1990 by Society of Automotive Engineers of Japan, Inc., c. f. pp 179-180" which will hereinafter referred to as "AUTOMOTIVE ENGINEERING HANDBOOK", the behavior of the vehicle is however judged after each tire reaches a friction limit. For this reason, there is apprehension that cornering force will be reduced to promote under-steering when the velocity of the vehicle is reduced in the condition that each tire reaches a friction limit. Moreover, in the actual control system, there is a dead zone incapable of being controlled. For this reason, the aforementioned control is executed after the behavior of the vehicle occurs to a certain degree.

Moreover, as the curve shape of the road is formed into a clothoid curve, when the driver intends to trace the curve of the road, the steering wheel will be rotated with a gradual increasing amount. Accordingly, when the velocity of approach to the curve is high, side force generated in the wheels does not balance with centrifugal force so that the vehicle shows a tendency to swelling on the outside of the curve. In such a case, the apparatus described in the document "AUTOMOTIVE ENGINEERING HANDBOOK" or in JP-A-62-146754 will operate to control the motion of the vehicle. However, as the control starts at the cornering limit, there is a possibility that the vehicle velocity cannot be reduced sufficiently by the control. There is a possibility that swelling on the outside of the curve cannot be prevented by only the aforementioned control.

Incidentally, in the document "AUTOMOTIVE ENGINEERING HANDBOOK", the state in which each tire rolls while sideslipping with a slip angle α has been explained as shown in FIG. 2.

That is, in FIG. 2, the tread surface of the tire represented by the broken line touches the road surface at a front end of a contacting surface including a point A and moves to a point B in the direction of movement of the tire while adhering to the road surface. The tread surface of tire begins to slip at the point of time when flow stress based on lateral shear deformation becomes equal to friction force. The tread surface of the tire is departed from the road surface at a rear end including a point C and restored to its original state. On this occasion, force Fy (side force) generated in the contacting surface as a whole is given as the product of the lateral deformed area (hatched in FIG. 2) of the tread portion and the lateral elastic constant of the tread portion per unit area. As shown in FIG. 2, a point of application of side force Fy is located in the rear (left in FIG. 2) far by $e_n$ (pneumatic trail) from a point O just under the center line of the tire. Accordingly, moment Fy·$e_n$ in this case is self-aligning torque (Tsa) which acts to reduce the lateral slip angle α.

Next, the case where tires are attached to the vehicle will be described with reference to FIG. 3 which is a graph obtained by simplifying FIG. 2. In steering the wheels of the vehicle, a caster angle is generally formed so that a caster trail $e_c$ is provided in order to make it easy to return the steering wheel. Accordingly, the landing point of each wheel is a point O', so that the moment to restore the steering wheel is Fy·($e_n$+$e_c$).

When the lateral grip state of the tire is reduced to enlarge the slip region, the tread portion is laterally deformed from a figure ABC to a figure ADC in FIG. 3. As a result, the point of application of side force Fy moves forward (from a point H to a point J in FIG. 3) in the direction of the movement of the vehicle. That is, the pneumatic trail $e_n$ is reduced. Accordingly, even if the same side force Fy is applied, the pneumatic trail $e_n$ is increased and the self-aligning torque Tsa is increased when the adhesive region is large and the slip region is small (that is, when the lateral grip of the tire is high). On the other hand, the pneumatic trail $e_n$ is reduced and the self-aligning torque Tsa is reduced when the lateral grip of the tire is lost and the slip region is large.

As described above, when attention is paid to change in pneumatic trail $e_n$, the lateral grip factor of the tire can be detected. Because change in pneumatic trail $e_n$ is expressed in self-aligning torque Tsa, the grip factor indicating the grip level of lateral grip of wheels in the front of the vehicle (hereinafter referred to as grip factor) can be estimated on the basis of the self-aligning torque Tsa. Alternatively, the grip factor can be also estimated on the basis of the allowance of side force relative to the road surface friction as will be described later.

The grip factor is different from the lateral force activity ratio or lateral G activity ratio disclosed in JP-A-11-099956 as follows. In the apparatus described in JP-A-11-099956, the maximum lateral force which can be generated in the road surface is calculated on the basis of the friction coefficient μ of the road surface. The friction coefficient μ of the road surface is estimated on the basis of dependency of cornering power Cp (defined as a value of side force at a slip angle of 1 deg.) on the friction coefficient μ of the road surface. The cornering power Cp is however affected not only by the friction coefficient μ of the road surface but also by the shape of the contacting surface of the tire (the length and width of the contacting surface), the elasticity of tread rubber, and so on. When, for example, water is interposed in the tread surface or the elasticity of tread rubber changes according to the abrasion of the tire and the temperature, the cornering power Cp varies even in the case where the friction coefficient μ of the road surface is kept constant. As described above, in the technique described in JP-A-11-099956, there is no consideration about tire characteristic of each wheel.

SUMMARY OF THE INVENTION

Therefore, one of objects of the invention is to provide a grip factor estimating apparatus which can accurately estimate the grip factor indicating the grip level of lateral grip of each wheel so that a driver can be alarmed when, for example, the grip factor is lower than a first predetermined value.

Another object of the invention is to provide a grip factor estimating apparatus which can estimate the grip factor accurately without any influence of braking or driving force applied on each wheel though self-aligning torque is affected by the braking or driving force.

A further object of the invention is to provide a vehicle motion control apparatus which can estimate the grip factor accurately without influence of the braking or driving force and which can control the motion of the vehicle appropriately on the basis of the grip factor when the grip factor is lower than a second predetermined value.

According to a first aspect of the invention, there is provided an apparatus for estimating a grip factor of a wheel of a vehicle, the apparatus including: a steering factor detecting unit that detects at least one of steering factors including a steering torque and steering effort applied on a steering system extending from a steering wheel to a suspension in a vehicle; a longitudinal force estimating unit that estimates a driving or braking force of the wheel; a self-aligning torque estimating unit that estimates self-aligning torque generated in the wheel on the basis of the steering factor detected by the steering factor detecting unit, estimates a quantity of influence of the driving or braking force estimated by the longitudinal force estimating unit on the self-aligning torque, and estimates a value obtained by removing the quantity of influence from the self-aligning torque as new self-aligning torque; a vehicle state variable detecting unit that detects a state variable of the vehicle; a wheel factor estimating unit that estimates at least one of wheel factors including side force and slip angle applied on the wheel on the basis of the state variable detected by the vehicle state variable detecting unit; and a grip factor estimating unit that estimates a grip factor of the wheel on the basis of change of the self-aligning torque newly estimated by the self-aligning torque estimating unit relative to the wheel factor estimated by the wheel factor estimating unit.

According to a second aspect of the invention, there is provided a vehicle motion control apparatus including: a steering factor detecting unit that detects at least one of steering factors including a steering torque and steering effort applied on a steering system extending from a steering wheel to a suspension in a vehicle; a longitudinal force estimating unit that estimates a driving or braking force of the wheel; a self-aligning torque estimating unit that estimates self-aligning torque generated in the wheel on the basis of the steering factor detected by the steering factor detecting unit, estimates a quantity of influence of the driving or braking force estimated by the longitudinal force estimating unit on the self-aligning torque, and estimates a value obtained by removing the quantity of influence from the self-aligning torque as new self-aligning torque; a vehicle state variable detecting unit that detects a state variable of the vehicle; a wheel factor estimating unit that estimates at least one of wheel factors including side force and slip angle applied on the wheel on the basis of the state variable detected by the vehicle state variable detecting unit; a grip factor estimating unit that estimates a grip factor of the wheel on the basis of change of the self-aligning torque newly estimated by the self-aligning torque estimating unit relative to the wheel factor estimated by the wheel factor estimating unit; and a control unit that controls at least one of braking force, engine output and gear shift position of the vehicle to reduce a speed of the vehicle when the grip factor estimated by the grip factor estimating unit is lower than a predetermined value.

BRIEF DESCRIPTION OF THE DRAWINGS

These and other objects and advantages of the present invention will become more fully apparent from the following detailed description taken with the accompanying drawings, in which.

DETAILED DESCRIPTION OF THE PREFERRED EMBODIMENTS

Referring now to the accompanying drawings, a description will be given in detail of preferred embodiments of the invention.

1. Embodiment of Grip Factor Estimating Apparatus

Figure 1:
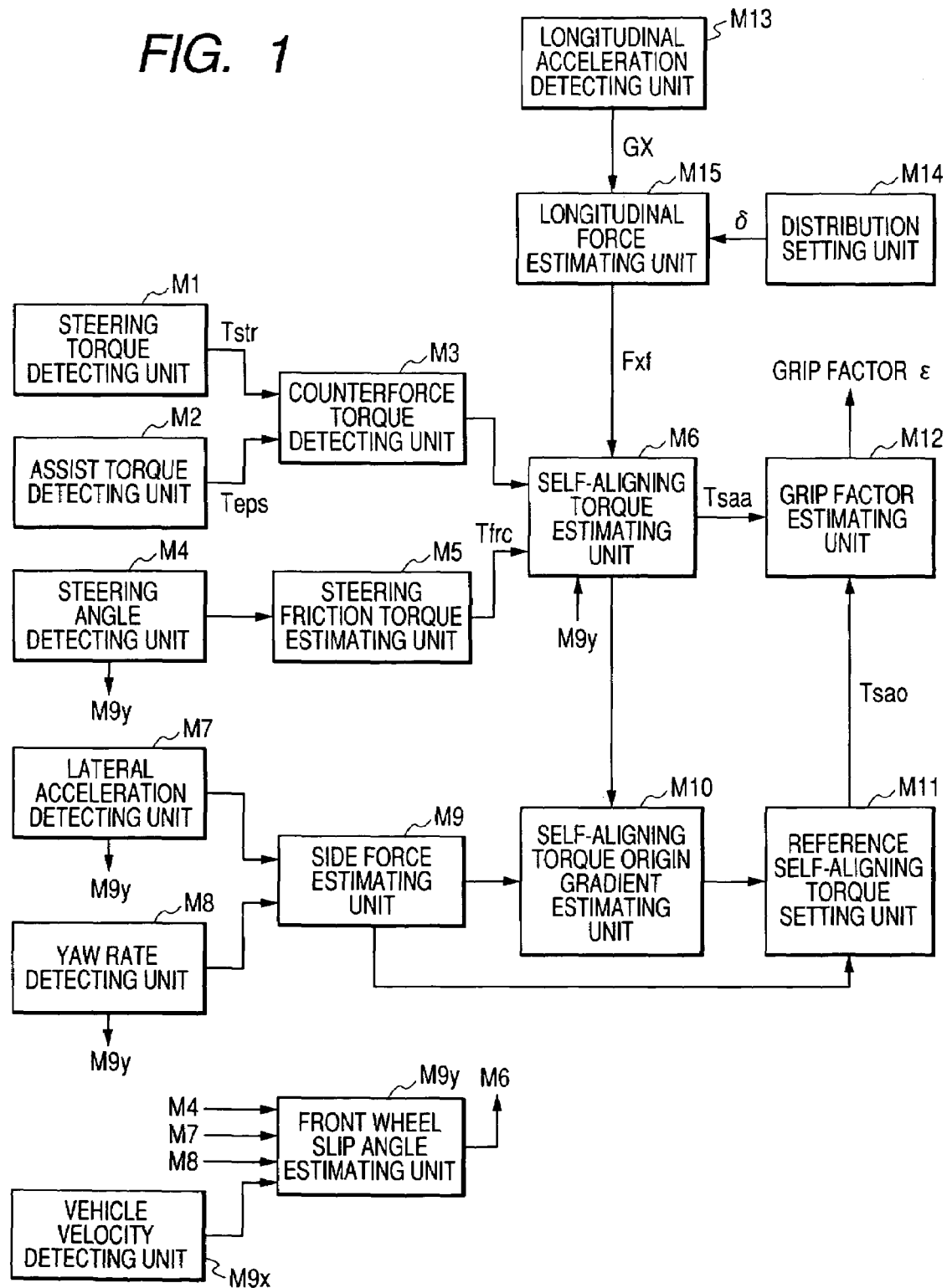
FIG. 1 is a block diagram showing an embodiment of a grip factor estimating apparatus according to the invention.

FIG. 1 is a block diagram showing a main configuration of a grip factor estimating apparatus for estimating the degree of grip on the basis of side force and self-aligning torque according to an embodiment of the invention. First, an example of estimation of the grip factor will be described with reference to FIGS. 2-4.

Figure 2:
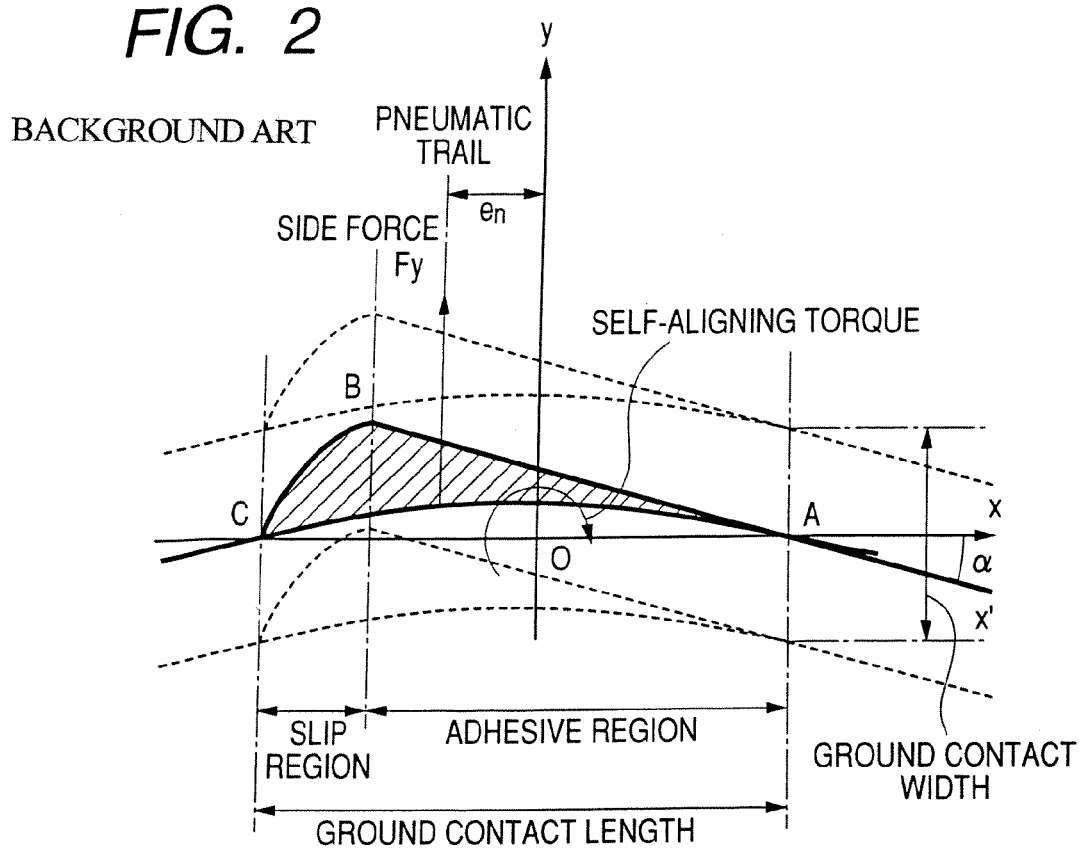
FIG. 2 is a graph concerning a general vehicle and showing the relation between self-aligning torque and side force in a state in which tires are rolling while slipping laterally.
Figure 3:
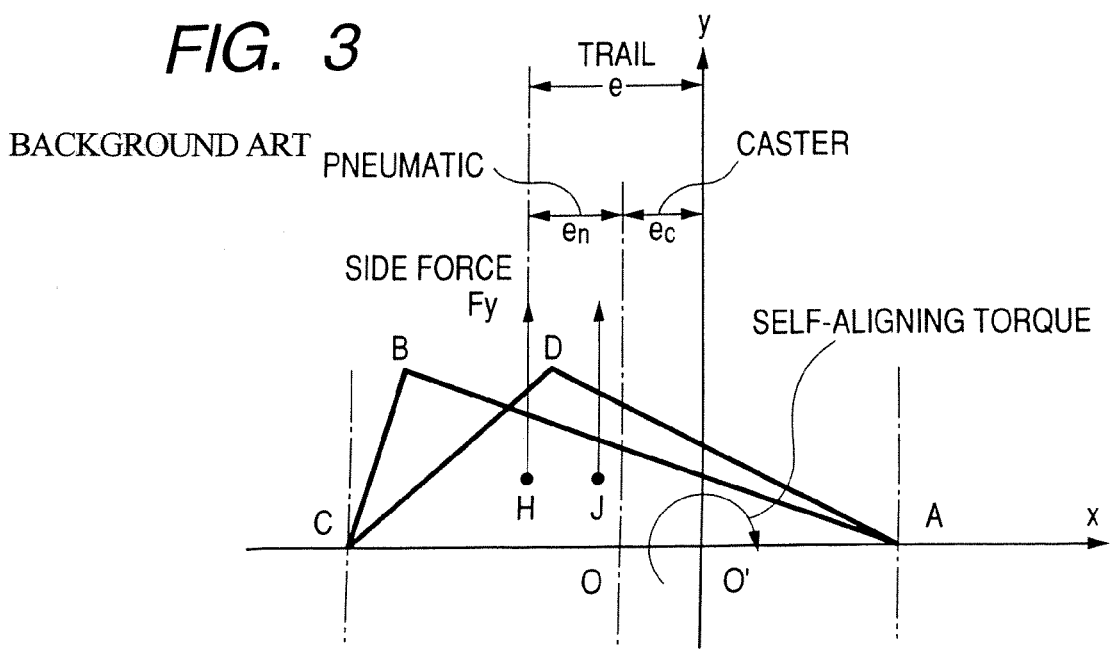
FIG. 3 is a graph showing simply the relation between self-aligning torque and side force in FIG. 2.

As is obvious from FIGS. 2 and 3, characteristic of self-aligning torque relative to front wheel side force applied on wheels in the front of a vehicle (hereinafter referred to as front wheels) is given as represented by Tsa in FIG. 4. As described above, actual self-aligning torque Tsaa is given by the expression Tsaa=Fyf·($e_n+e_c$) in which Fyf is front wheel side force. Accordingly, nonlinear characteristic of the actual self-aligning torque Tsaa with respect to the front wheel side force Fyf expresses direct change in pneumatic trail $e_n$. Accordingly, a gradient K1 of the actual self-aligning torque Tsaa relative to the front wheel side force Fyf in the neighbor of the origin O (where the front wheels are in a grip state) is specified, that is, characteristic expressing self-aligning torque characteristic (reference self-aligning torque Tsao) in a perfect grip state is obtained. Incidentally, a predetermined value experimentally measured is preferably used as an initial value of the gradient K1 so that the gradient K1 can be specified and corrected during ordinary traveling in which the grip factor is high. Incidentally, the actual self-aligning torque Tsaa can be calculated by an arithmetic operation which will be described later.

The grip factor $\epsilon$ of the front wheels is estimated on the basis of the actual self-aligning torque Tsaa relative to the reference self-aligning torque Tsao. When, for example, the front wheel side force Fyf takes a value Fyf1, the grip factor $\epsilon$ can be given by the expression $\epsilon$=Tsaa1/Tsao1 on the basis of the value Tsao1 (=K1·Fyf1) of the reference self-aligning torque Tsao and the value Tssa1 of the actual self-aligning torque Tsaa.

Figure 13:
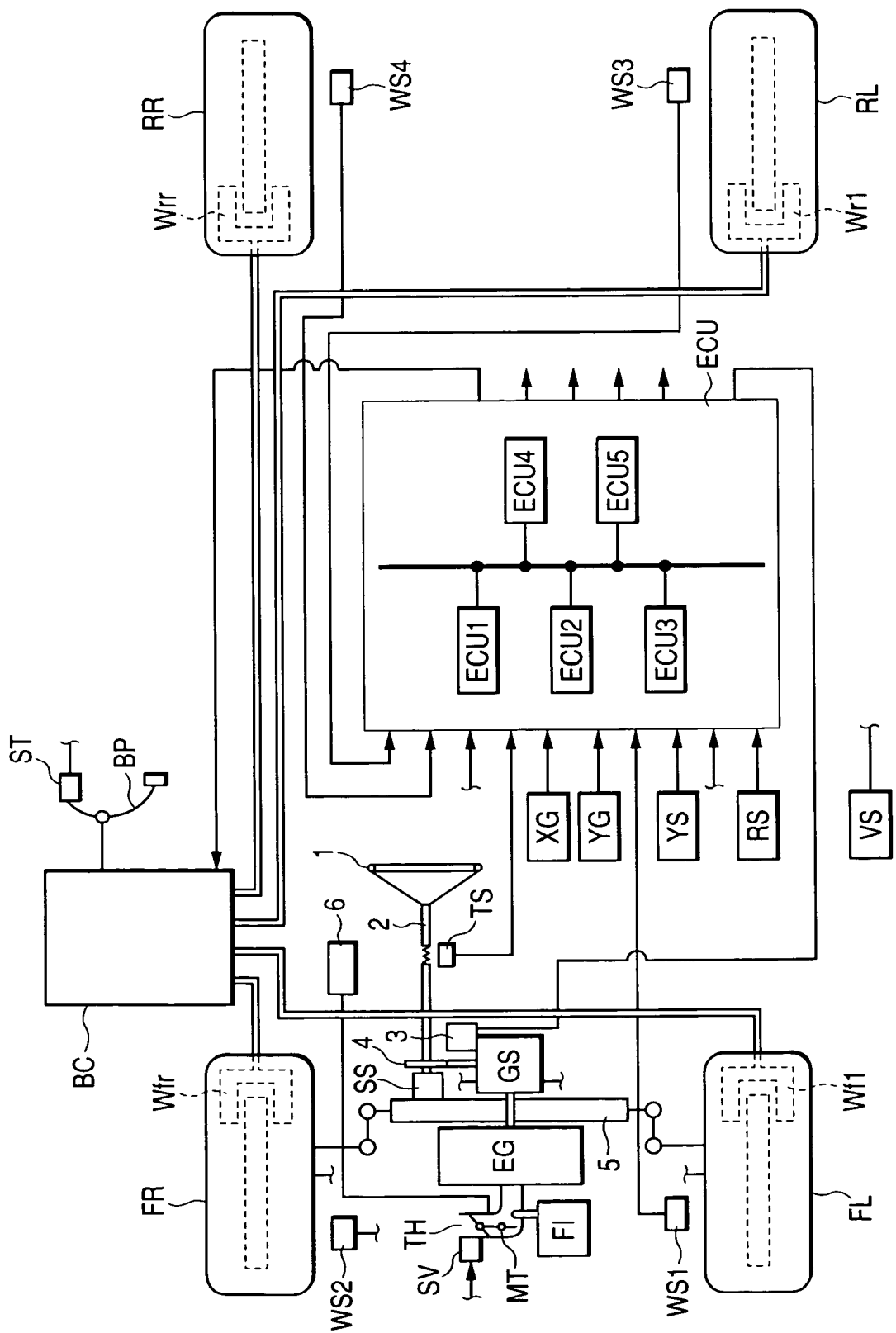
FIG. 13 is a block diagram showing an embodiment of a vehicle motion control apparatus according to the invention.
Figure 14:
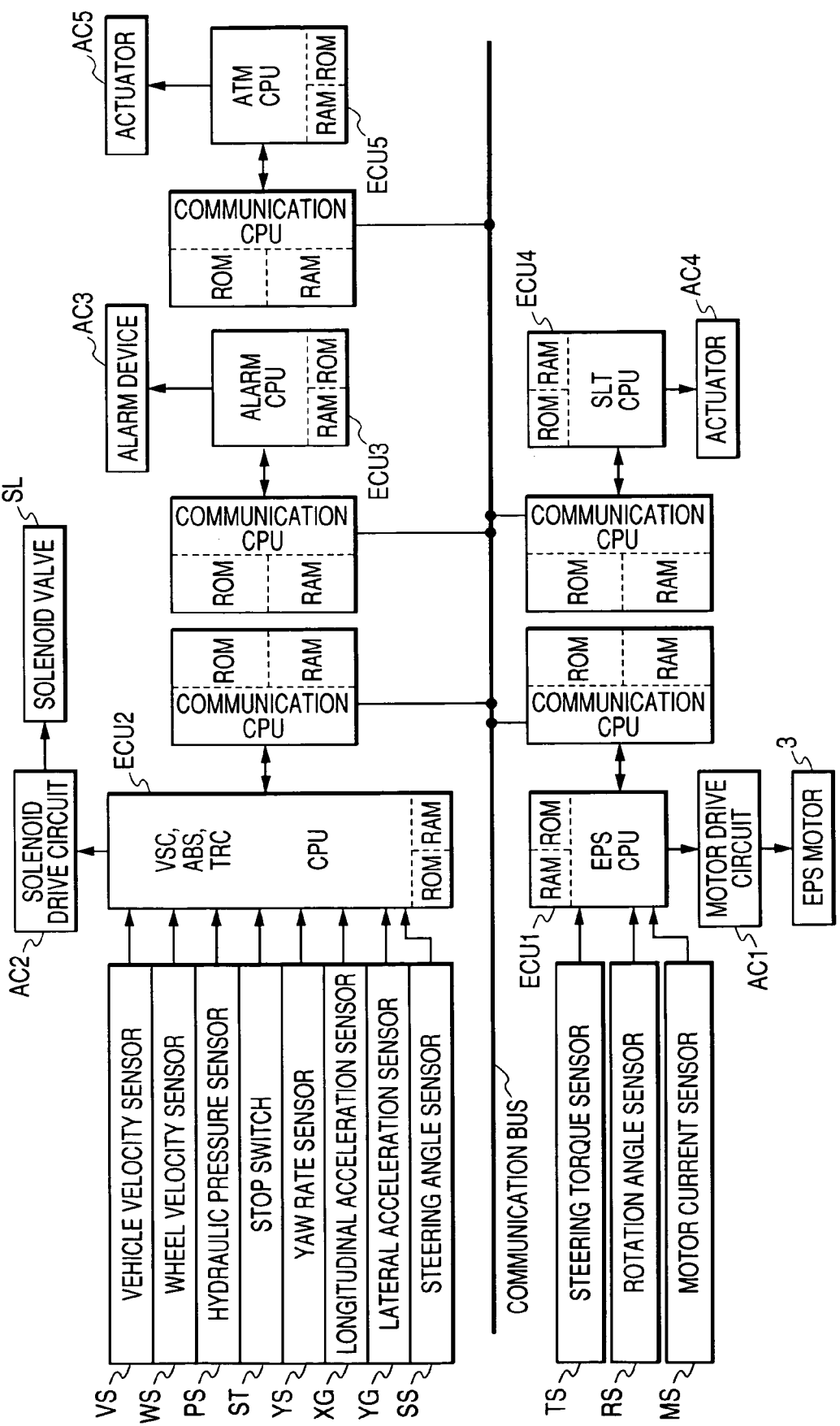
FIG. 14 is a block diagram showing the system configuration of the vehicle motion control apparatus according to the embodiment of the invention.

As described above, the grip factor of wheels can be estimated on the basis of change in self-aligning torque (actual self-aligning torque Tsaa) relative to side force (front wheel side force Fyf). This estimation can be achieved by configuration as shown in FIG. 1. FIGS. 13 and 14 show a specific example of the configuration. First, in FIG. 1, a steering torque detecting unit M1 and an assist torque detecting unit M2 are provided as a steering factor detecting unit for detecting at least one (e.g. steering torque) of steering factors including steering torque and steering effort applied on a steering system extending from a steering wheel (not shown) to a suspension (not shown) in a vehicle. Counterforce torque is detected by a counterforce torque detecting unit M3 on the basis of results detected by these units M1 and M2. The detected value of counterforce torque is input to a self-aligning torque estimating unit M6.

In this embodiment, an electric power steering apparatus (EPS) which will be described later serves also as the grip factor estimating apparatus. For example, the EPS is configured as shown in FIGS. 13 and 14. The EPS will be described later in detail with reference to FIGS. 13 and 14. Only the outline of the EPS is described now.

In the electric power steering apparatus according to this embodiment, steering torque Tstr acting on a steering shaft 2 in accordance with the driver's operation of a steering wheel 1 is detected by a steering torque sensor TS provided as the steering torque detecting unit M1. The electric power steering apparatus controls an EPS motor 3 (electric motor) in accordance with the detected value of steering torque Tstr to steer the front wheels FL and FR through a reduction gear 4 and a rack and pinion 5 to thereby relieve the driver's steering effort. The assist torque detecting unit M2 detects (estimates) assist torque on the basis of a motor current of the EPS motor 3 detected by a motor current sensor MS provided in a motor drive circuit AC1 in FIG. 13.

Figure 6:
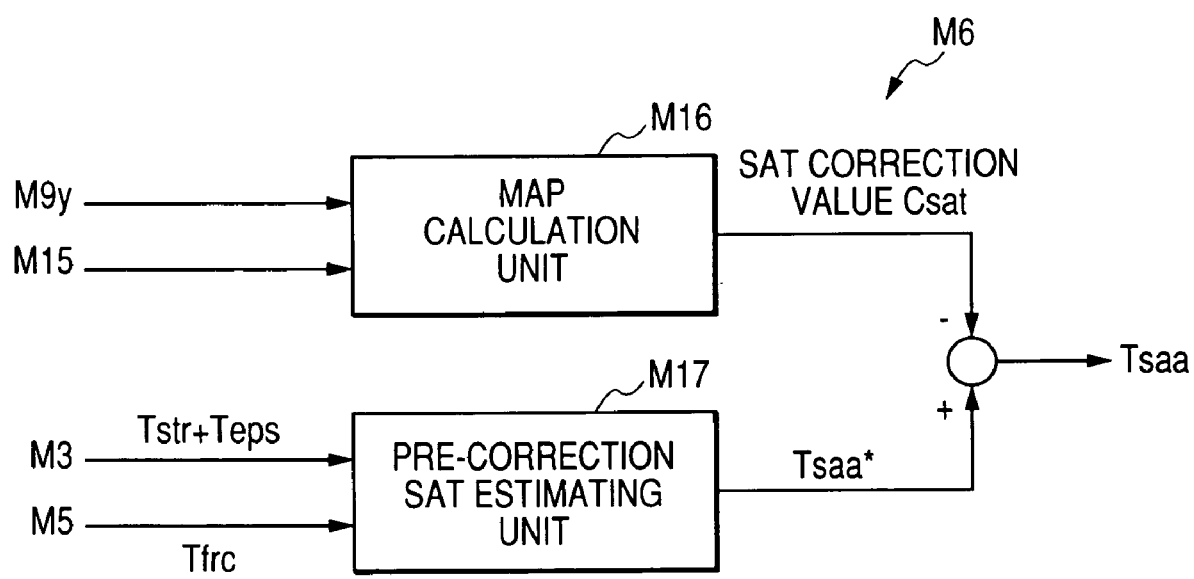
FIG. 6 is a block diagram of a self-aligning torque estimating unit M6.

A steering angle is detected by a steering angle sensor SS provided as a steering angle detecting unit M4 and shown in FIG. 13. Steering friction torque (which may be also referred to as "friction torque" simply) is estimated by a steering friction torque estimating unit M5 on the basis of the detected value of the steering angle and input to the self-aligning torque estimating unit M6. The self-aligning torque estimating unit M6 includes a map calculation unit M16 and pre-correction self-aligning torque estimating unit M17, as shown in FIG. 6. Incidentally, this thing will be described later in detail.

Longitudinal acceleration Gx acting on the vehicle is detected by a longitudinal acceleration sensor XG provided as a longitudinal acceleration detecting unit M13 and shown in FIGS. 13 and 14. The detected value of longitudinal acceleration Gx is input to a longitudinal force estimating unit M15. Although this embodiment shows the case where the longitudinal acceleration detecting unit M13 is constituted by the longitudinal acceleration sensor XG, the invention is not limited thereto. For example, vehicle velocity detected by a vehicle velocity detecting unit M9$x$ may be differentiated with respect to time to thereby calculate longitudinal acceleration Gx.

Front wheel longitudinal force Fxf is estimated by a longitudinal force estimating unit M15 on the basis of the longitudinal acceleration Gx, vehicle weight W and a longitudinal driving or braking force distribution set by a distribution setting unit M14. The estimated value of front wheel longitudinal force Fxf is input to the self-aligning torque estimating unit M6. Incidentally, the details of this thing will be described later.

A front wheel slip angle (lateral slip angle) is estimated by a front wheel slip angle estimating unit M9$y$ on the basis of the steering angle, yaw rate, lateral acceleration and vehicle velocity. The estimated value of the front wheel slip angle is input to the self-aligning torque estimating unit M6.

That is, vehicle body slip angular velocity $d\beta/dt$ is first calculated by the front wheel slip angle estimating unit M9$y$ on the basis of yaw rate, lateral acceleration and vehicle velocity and integrated with respect to time to thereby calculate a vehicle body slip angle $\beta$. A front wheel slip angle $\alpha f$ is calculated on the basis of the vehicle body slip angle $\beta$ and in accordance with the vehicle velocity, steering angle and various factors of the vehicle. Incidentally, the vehicle body slip angle $\beta$ may be calculated by another method than the integrating method. For example, the vehicle body slip angle $\beta$ may be estimated on the basis of a vehicle model or may be calculated by combination of the estimating method and the integrating method. Incidentally, the lateral acceleration Gy of the vehicle is detected by a lateral acceleration sensor YG (see FIGS. 13 and 14) provided as a lateral acceleration detecting unit M7. The yaw rate $\gamma$ of the vehicle is detected by a yaw rate sensor YS (see FIGS. 13 and 14) provided as a yaw rate detecting unit M8. The vehicle velocity is detected by a vehicle velocity sensor VS (see FIGS. 13 and 14) provided as a vehicle velocity detecting unit M9$x$.

The actual self-aligning torque Tsaa generated in the front wheels FL and FR is estimated by the self-aligning torque estimating unit M6 on the basis of the respective input values of counterforce torque, friction torque, front wheel longitudinal force Fxf and front wheel slip angle. The generation of the actual self-aligning torque Tsaa will be described later in detail.

On the other hand, in this embodiment, a lateral acceleration detecting unit M7 and a yaw rate detecting unit M8 are provided as a vehicle state variable detecting unit for detecting the state variable of the vehicle. At least one (e.g. front wheel side force Fyf in FIG. 1) of front wheel factors including side force and front wheel slip angle for the front wheels FL and FR is estimated by a side force estimating unit M9 as a wheel factor estimating unit on the basis of signals detected by the unit M7 and M8.

The front wheel side force Fyf is estimated in accordance with the expression Fyf=(Lr·m·Gy+Iz·d$\gamma$/dt)/L on the basis of results output from the lateral acceleration detecting unit M7 and the yaw rate detecting unit M8. In the expression, Lr is the distance from the center of gravity to a rear wheel axle, "m" is the mass of the vehicle, L is the wheel base, Iz is the yaw moment of inertia, Gy is the lateral acceleration, and d$\gamma$/dt is the differential value of yaw rate with respect to time.

Reference self-aligning torque is set by a reference self-aligning torque setting unit M11 on the basis of the actual self-aligning torque Tsaa estimated by the self-aligning torque estimating unit M6 and the front wheel side force Fyf estimated by the side force estimating unit M9. For example, a gradient of self-aligning torque in the neighbor of the origin is estimated by a self-aligning torque origin gradient estimating unit M10, so that reference self-aligning torque is set by the reference self-aligning torque setting unit M11 on the basis of the gradient and the front wheel side force. The grip factor $\epsilon$ for the front wheels is estimated by a grip factor estimating unit M12 on the basis of a result of comparison between the reference self-aligning torque set by the reference self-aligning torque setting unit M11 and the self-aligning torque estimated by the self-aligning torque estimating unit M6.

Figure 4:
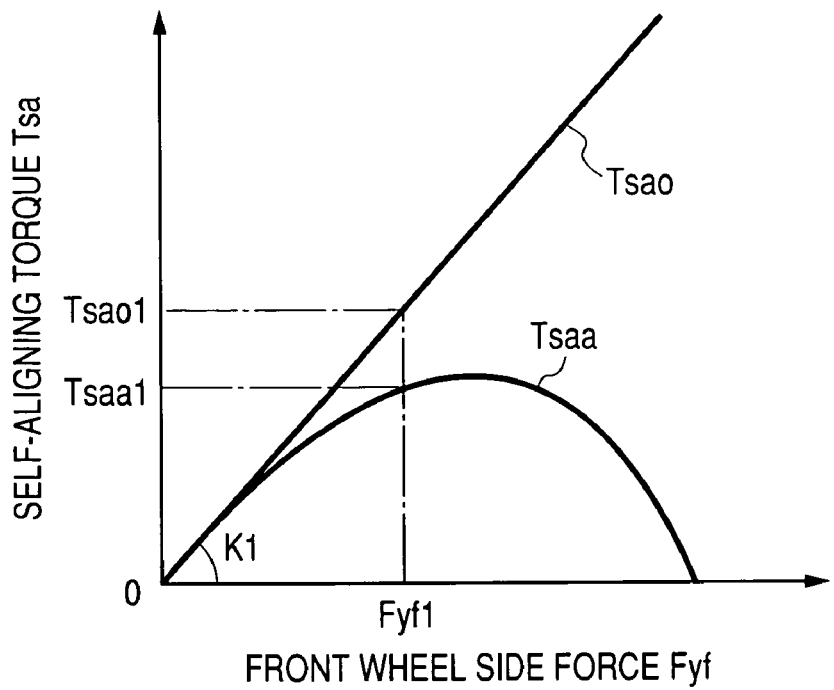
FIG. 4 is a graph showing characteristic of self-aligning torque versus front wheel side force in an embodiment of the invention.

That is, in FIG. 1, a self-aligning torque gradient K1 in the neighbor of the origin in FIG. 4 is calculated on the basis of the actual self-aligning torque Tsaa estimated by the self-aligning torque estimating unit M6 and the front wheel side force Fyf estimated by the side force estimating unit M9. Reference self-aligning torque Tsao is calculated in accordance with the expression Tsao=K1·Fyf on the basis of the gradient K1 and the front wheel side force Fyf. The reference self-aligning torque Tsao is compared with the actual self-aligning torque Tsaa. The grip factor $\epsilon$ is calculated in accordance with the expression $\epsilon$=Tsaa/Tsao on the basis of a result of the comparison.

As described above, the electric power steering apparatus (EPS) is provided in this embodiment. Because the motor current of the EPS is proportional to assist torque, counterforce torque can be estimated easily on the basis of the assist torque and a result (steering torque) detected by the steering torque detecting unit M1. (This will be described later.) On the other hand, it is necessary to compensate for torque caused by friction of the steering system. The difference between the maximum of counterforce torque at the time of further turning the steering wheel and the value of counterforce torque at the time of returning the steering wheel is calculated as friction torque (steering friction torque) by the steering friction torque estimating unit M5, so that the friction torque is corrected successively. This thing will be also described later. For this reason, self-aligning torque (actual self-aligning torque Tsaa) can be estimated appropriately. It is a matter of course that the invention is not limited thereto. For example, a load cell or the like may be provided on a steering shaft (not shown) or a strain gage may be provided on a suspension member so that self-aligning torque can be measured on the basis of a signal detected by the load cell or the strain gage.

In this embodiment, a steering control unit ECU1 which will be described later is equivalent to the assist torque detecting unit M2, the counterforce torque detecting unit M3 and the steering friction torque estimating unit M5. The steering control unit ECU1 is also equivalent to the self-aligning torque estimating unit M6 (map calculation unit M16 and pre-correction self-aligning torque estimating unit M17), the side force estimating unit M9, the front wheel slip angle estimating unit M9y and the self-aligning torque origin gradient estimating unit M10. The steering control unit ECU1 is further equivalent to the reference self-aligning torque setting unit M11, the grip factor estimating unit M12, the distribution setting unit M14 and the longitudinal force estimating unit M15.

2. Another Embodiment of Grip Factor Estimating Apparatus

Figure 7:
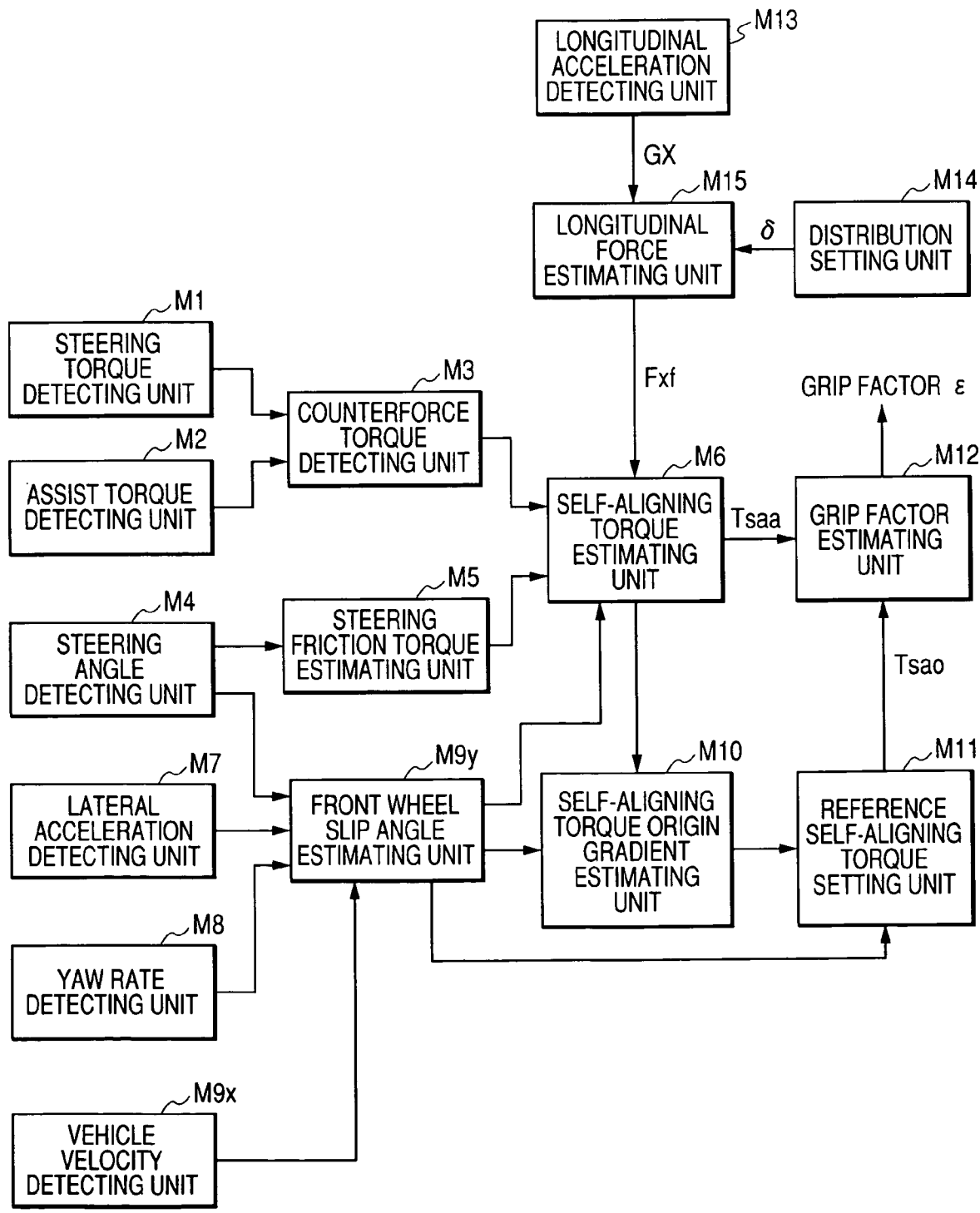
FIG. 7 is a block diagram of a grip factor estimating apparatus according to another embodiment of the invention.

FIGS. 7-12 relate to another embodiment of the grip factor estimating apparatus according to the invention. In this embodiment, a front wheel slip angle is used as the wheel factor in the invention. FIG. 7 is a block diagram of the grip factor estimating apparatus for estimating the grip factor on the basis of front wheel slip angle and self-aligning torque. Blocks M1 to M6 are the same as those shown in FIG. 1 and provided for calculating counterforce torque and steering friction torque and estimating self-aligning torque. On the other hand, the front wheel slip angle is calculated on the basis of the steering angle, yaw rate, lateral acceleration and vehicle velocity. Like FIG. 1, signals detected by the steering angle detecting unit M4, the lateral acceleration detecting unit M7 and the yaw rate detecting unit M8, as well as a signal detected by the vehicle velocity detecting unit M9x, are input to the front wheel slip angle estimating unit M9y provided as a wheel factor estimating unit. The steering angle detecting unit M4, the lateral acceleration detecting unit M7, the yaw rate detecting unit M8 and the vehicle velocity detecting unit M9x are equivalent to a vehicle state variable detecting unit for detecting the state variable of the vehicle.

Vehicle body slip angular velocity $d\beta/dt$ is first calculated by the front wheel slip angle estimating unit M9y on the basis of the yaw rate, lateral acceleration and vehicle velocity and integrated with respect to time to obtain a vehicle body slip angle $\beta$. A front wheel slip angle $\alpha f$ is calculated on the basis of the vehicle body slip angle $\beta$ and in accordance with the vehicle velocity, steering angle and various factors of the vehicle. Incidentally, the vehicle body slip angle $\beta$ may be calculated by another method than the integrating method. For example, the vehicle body slip angle $\beta$ may be estimated on the basis of a vehicle model or may be calculated by combination of the estimating method and the integrating method.

A gradient of self-aligning torque at the origin is specified by the self-aligning torque origin gradient estimating unit M10 on the basis of the self-aligning torque and front wheel slip angle $\alpha f$ estimated as described above. Reference self-aligning torque is set by the reference self-aligning torque setting unit M11 on the basis of the gradient and the front wheel slip angle. The grip factor $\epsilon$ for the front wheels is estimated by the grip factor estimating unit M12 on the basis of a result of comparison between the reference self-aligning torque set by the reference self-aligning torque setting unit M11 and the self-aligning torque estimated by the self-aligning torque estimating unit M6.

Figure 8:
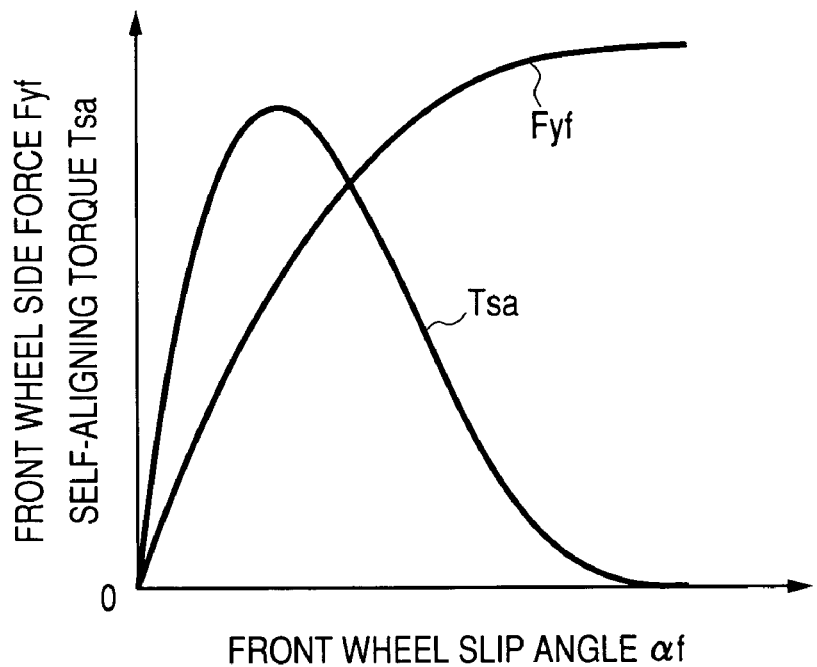
FIG. 8 is a graph showing the relation of front wheel side force and self-aligning torque versus front wheel slip angle in another embodiment of the invention.
Figure 9:
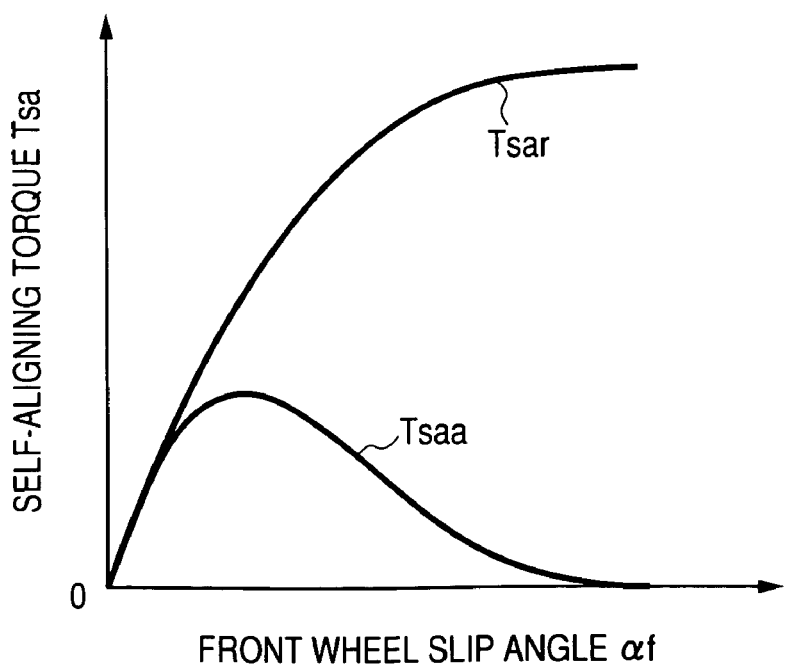
FIG. 9 is a graph showing the relation of self-aligning torque versus front wheel slip angle in another embodiment of the invention.

The estimation of the grip factor $\epsilon$ in the embodiment shown in FIG. 7 will be described below in detail with reference to FIGS. 8 to 12. The relations of front wheel side force Fyf and self-aligning torque Tsa with respect to the wheel slip angle, especially the wheel slip angle of the front wheels (hereinafter referred to as front wheel slip angle $\alpha f$) are as shown in FIG. 8. That is, each of front wheel side force Fyf and self-aligning torque Tsa has nonlinear characteristic with respect to the front wheel slip angle $\alpha f$. When the wheels (front wheels) are in a grip state, that is, when the pneumatic trail $e_n$ is in a perfect grip state, self-aligning torque characteristic shows nonlinearity as represented by Tsar in FIG. 9 because the self-aligning torque Tsa is the product of the front wheel side force Fyf and the trail $\underline{e}$ ($=e_n+e_c$)

Figure 10:
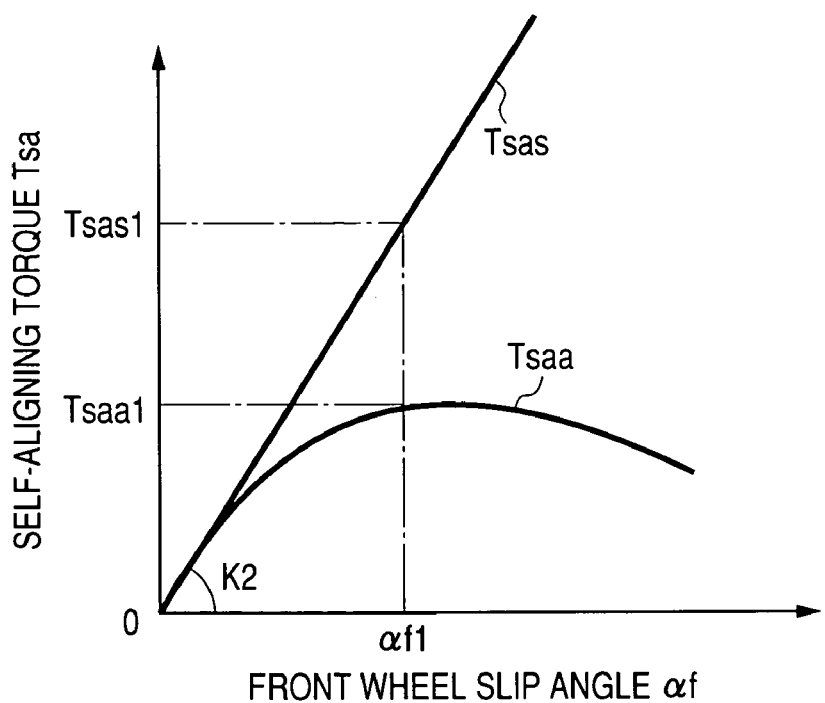
FIG. 10 is a graph showing the relation of self-aligning torque versus front wheel slip angle in another embodiment of the invention.

In this embodiment, however, as shown in FIG. 10, a gradient K2 of self-aligning torque Tsa with respect to the front wheel slip angle is calculated in the neighbor of the origin to thereby set reference self-aligning torque characteristic (represented by Tsas in FIG. 10) on the assumption that self-aligning characteristic in a perfect grip state shows linearity. When, for example, the front wheel slip angle is $\alpha f1$, the reference self-aligning torque is calculated in accordance with the expression Tsas1=K2·$\alpha f1$. The grip factor $\epsilon$ is calculated in accordance with the expression $\epsilon$=Tsaa1/Tsas1=Tsaa1/(K2·$\alpha f1$).

Figure 11:
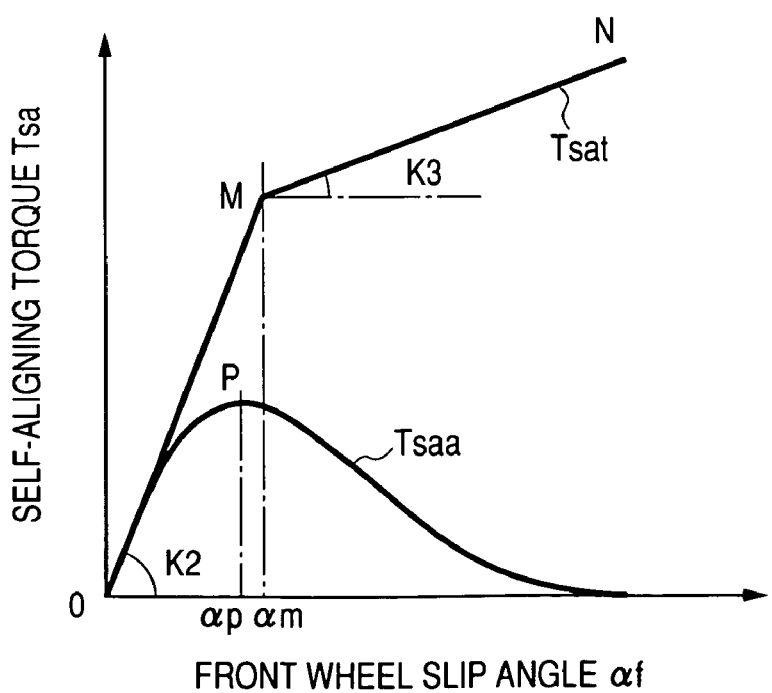
FIG. 11 is a graph showing the relation of self-aligning torque versus front wheel slip angle in another embodiment of the invention.

In the method for setting the reference self-aligning torque in FIG. 10, error at the time of estimation of the grip factor may become large in a region where the front wheel slip angle $\alpha f$ is large, because of the assumption that the reference self-aligning torque characteristic shows linearity. Accordingly, there is apprehension that accuracy in estimation of the grip factor will be lowered. It is therefore preferable that the gradient of self-aligning torque is set at K3 as shown in FIG. 11 when the front wheel slip angle is not smaller than a predetermined value. That is, it is preferable that the nonlinearity of the reference self-aligning torque characteristic is set so as to be approximated to lines represented by OMN in FIG. 11. Preferably, in this case, the gradient K3 of self-aligning torque is experimentally measured and set in advance so that the gradient K3 can be specified and corrected while the vehicle is running. Preferably, the point M may be set on the basis of a point (point P) of inflection of the actual self-aligning torque. For example, a point P of inflection of the actual self-aligning torque is calculated, so that a front wheel slip angle $\alpha m$ larger by a predetermined value than the front wheel slip angle $\alpha p$ at the point P of inflection is set as the point M.

Figure 12:
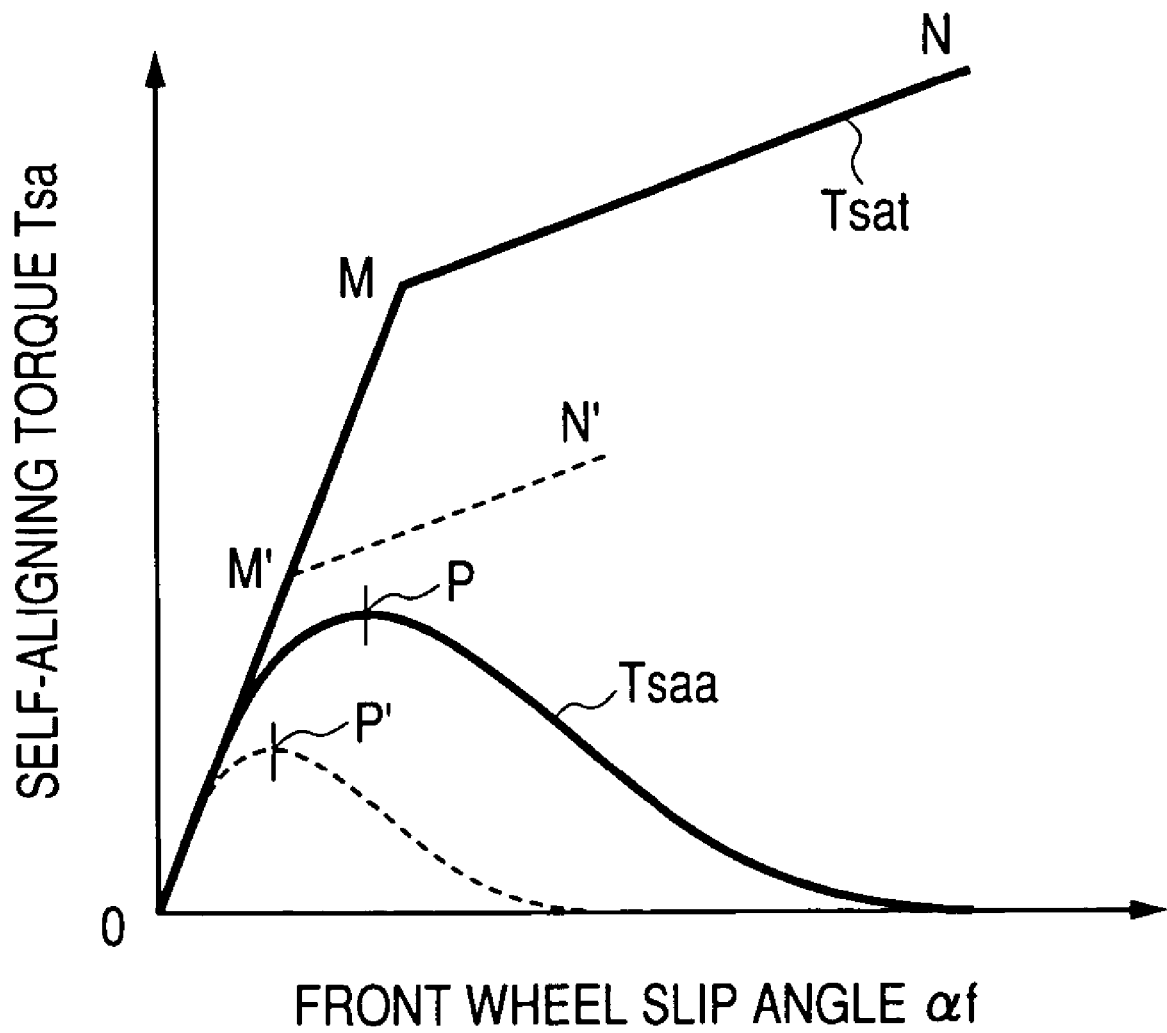
FIG. 12 is a graph showing the relation of self-aligning torque versus front wheel slip angle in another embodiment of the invention.

Moreover, the reference self-aligning torque with respect to the front wheel slip angle is affected by the friction coefficient $\mu$ of the road surface. Therefore, when the reference self-aligning torque is set on the basis of the point P of inflection of the actual self-aligning torque Tsaa as shown in FIG. 12, reference self-aligning torque characteristic can be set accurately. When, for example, the friction coefficient of the road surface becomes lower, characteristic of actual self-aligning torque Tsaa changes from the solid line to the broken line in FIG. 12. That is, when the friction coefficient $\mu$ of the road surface is lowered, the point of inflection of actual self-aligning torque Tsaa changes from the point P to a point P'. It is therefore necessary to change the reference self-aligning torque characteristic (Tsat) from OMN to OM'N'. On this occasion, even in the case where the friction coefficient of the road surface changes, the reference self-aligning torque characteristic can be set in accordance with the change of the friction coefficient of the road surface because the point M' is set on the basis of the point P' of inflection as described above.

3. Embodiment of Vehicle Motion Control Apparatus

FIG. 13 shows an embodiment of a vehicle motion control apparatus equipped with the aforementioned grip factor estimating apparatus. The vehicle motion control apparatus includes an electric power steering apparatus. The electric power steering apparatus has known hardware configuration. The electric power steering apparatus is configured so that steering torque Tstr acting on a steering shaft 2 in accordance with the driver's operation of a steering wheel 1 is detected by a steering torque sensor TS, and that an EPS motor (electric motor) 3 is controlled in accordance with the detected value of steering torque Tstr. The electric power steering apparatus steers front wheels FL and FR through a reduction gear 4 and a rack and pinion 5 to thereby relieve the driver's steering effort.

In this embodiment, the engine EG is an internal combustion engine having a throttle controller TH and a fuel injector FI. In the throttle controller TH, the main throttle opening of a main throttle valve MT is controlled in accordance with the operation of an accelerator pedal 6. The engine EG is further configured so that a sub throttle valve SV of the throttle controller TH is driven to control its sub throttle opening while the fuel injector FI is driven to control the quantity of injected fuel in accordance with the output of an electronic control unit ECU. In this embodiment, the engine EG is linked to front wheels FL and FR in the front of the vehicle through a gear shifting controller GS and differential gears (not shown) to thereby form a so-called front wheel drive system. However, the drive system in the invention is not limited thereto.

Incidentally, the electronic control unit ECU is equivalent to a control unit.

In this embodiment, a braking system is as follows. Wheel cylinders Wfl, Wfr, Wrl and Wrr are attached to the wheels (FL, FR, RL and RR) respectively. A braking hydraulic pressure controller BC is connected to the wheel cylinders Wfl, etc. The braking system will be described later in detail with reference to FIG. 15. Incidentally, the front wheel FL expresses a wheel in the front left viewed from the driver's seat, the front wheel FR expresses a wheel in the front right, the rear wheel RL expresses a wheel in the rear left, and the rear wheel RR expresses a wheel in the rear right.

Wheel velocity sensors WS1 to WS4 are disposed on the wheels (FL, FR, RL and RR) respectively. The wheel velocity sensors WS1 to WS4 are connected to the electronic control unit ECU so that rotational speed of each wheel, that is, a pulse signal having a number of pulses proportional to wheel velocity is input to the electronic control unit ECU. Further, a stop switch ST which turns on at the time of use of a brake pedal BP, a steering angle sensor SS for detecting a steering angle $\theta h$ of the front wheels FL and FR, a longitudinal acceleration sensor XG for detecting longitudinal acceleration Gx of the vehicle and a lateral acceleration sensor YG for detecting lateral acceleration Gy of the vehicle are connected to the electronic control unit ECU. Further, a yaw rate sensor YS for detecting the yaw rate $\gamma$ of the vehicle, a steering torque sensor TS, a rotation angle sensor RS for detecting the rotation angle of the EPS motor 3, and so on, are connected to the electronic control unit ECU.

FIG. 14 shows the system configuration of the electronic control unit ECU in this embodiment. In the system configuration, a steering control system (EPS), a brake control system (ABS, TRC and VSC), a throttle control (SLT) system, a shift control system (ATM) and an alarm system are connected to one another through a communication bus so that system information can be used in common to all the systems. The steering control system is formed so that a steering torque sensor TS and a rotation angle sensor RS are connected to a steering control unit ECU1 which has a CPU for controlling the electronic power steering apparatus, that is, an electric steering control (EPS) CPU, an ROM and an RAM, and that an EPS motor 3 is connected to the electronic control unit ECU1 through a motor drive circuit AC1.

The brake control system is provided for performing anti-skid brake control (ABS), traction control (TRC) and vehicle stability control (VSC).

The brake control system is formed so that wheel velocity sensors WS1 to WS4 (represented by WS) and hydraulic pressure sensors (represented by PS) are connected to a brake control unit ECU2 which has a brake control CPU, an ROM and an RAM. The stop switch ST, the yaw rate sensor YS, the longitudinal acceleration sensor XG, the lateral acceleration sensor YG and the steering angle sensor SS are connected to the brake control unit ECU2 while solenoid valves (represented by SL) are connected to the brake control unit ECU2 through a solenoid drive circuit AC2.

The alarm system is provided for giving an alarm when the grip factor estimated in the aforementioned manner is lower than a first predetermined value. The alarm system is formed so that an alarm device AC3 for outputting an indicator or voice or the like is connected to an alarm control unit ECU3 which has an alarm control CPU, an ROM and an RAM. The throttle control (SLT) system is formed so that a throttle control actuator AC4 is connected to a throttle control unit ECU4 which has a throttle control CPU, an ROM and an RAM. Similarly, the shift control system is formed so that a shift control actuator AC5 is connected to a shift control unit ECU5 which has an automatic transmission (ATM) shift control CPU, an ROM and an RAM. Incidentally, each of these control units ECU1 to ECU5 is connected to a communication bus through a communication unit which has a communication CPU, an ROM and an RAM. In this manner, information necessary for each control system can be received from another control system.

Figure 15:
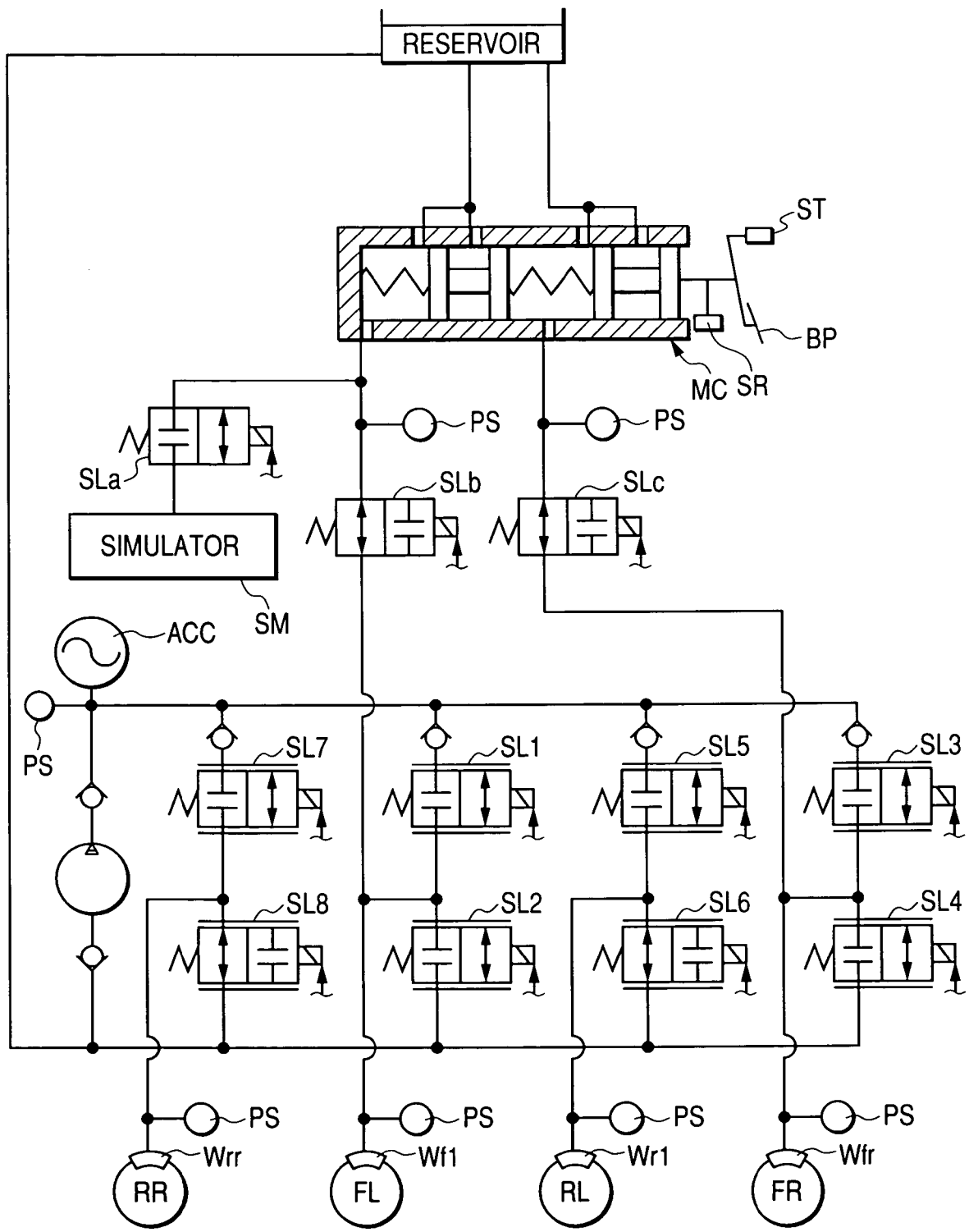
FIG. 15 is a block diagram showing a brake hydraulic pressure controller used in the embodiment of the invention.

FIG. 15 shows an example of the brake hydraulic pressure controller BC in this embodiment. The configuration shown in FIG. 15 is called "brake by wire" which is practically described in JP-A-2000-062597. For example, the brake hydraulic pressure controller BC has been described specifically in JP-A-2000-062597. The operation of the brake hydraulic pressure controller BC will be described in brief. At the time of ordinary operation, a hydraulic pressure circuit in a master cylinder MC is separated from hydraulic pressure circuits in the wheel cylinders Wfr, Wfl, Wrr and Wrl. A driver's control request is detected by a brake pedal operating quantity detecting unit M23 such as a brake pedal stroke sensor SR, a pedal pressure sensor, a master cylinder hydraulic pressure sensor, etc. A target braking force for each wheel is decided on the basis of the operating quantity, so that braking hydraulic pressure for each wheel is controlled by corresponding ones of linear solenoid valves (SL1 to SL8).

At the time of braking, on/off type solenoid valves SLa, SLb and SLc are excited so magnetically that the solenoid valve SLa is opened while the solenoid valves SLb and SLc are closed. As a result, the master cylinder MC is disconnected from the wheel cylinders Wfr, Wfl, Wrr and Wrl and connected to a stroke simulator SM through the solenoid valve SLa. Braking hydraulic pressure for each wheel is controlled in such a manner that an accumulator side linear solenoid valve (e.g. SL1) and a reservoir side linear solenoid valve (e.g. SL2) are controlled while a high-pressure accumulator ACC is used as a pressure source. That is, braking force is controlled independently in accordance with each wheel. Incidentally, the hydraulic pressure circuit configuration shown in FIG. 15 is an example. The hydraulic pressure circuit configuration is not limited thereto as long as pressure can be applied automatically.

Figure 16:
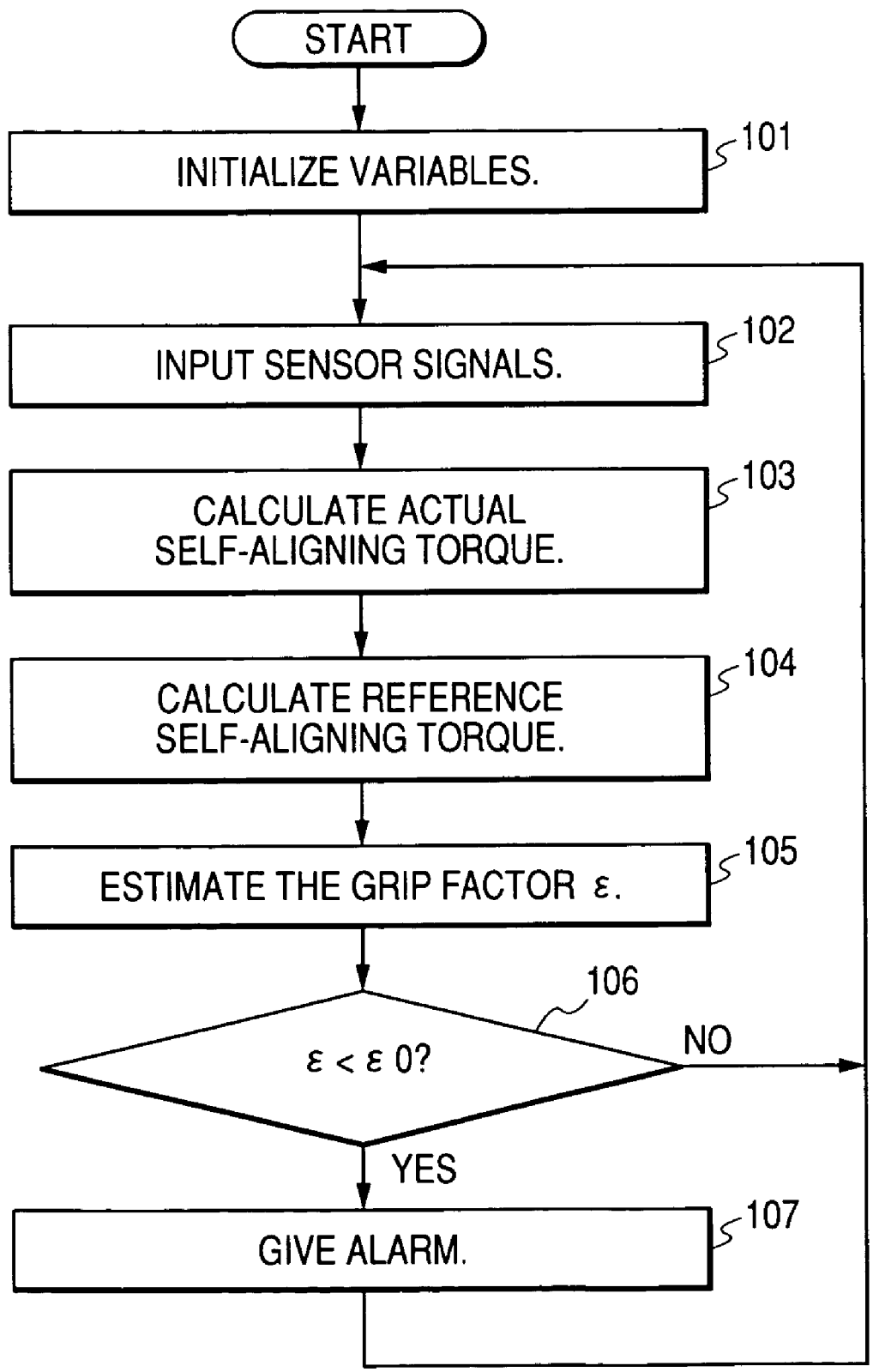
FIG. 16 is a flow chart showing processing in the case where the driver is alarmed of lowering of the grip factor in the embodiment of the invention.

In the vehicle motion control apparatus equipped with the grip factor estimating apparatus configured as described above, various kinds of control are carried out as follows. First, FIG. 16 is a flow chart showing processing in the case where the driver is alarmed of lowering of the grip factor.

First, in step 101, initialization is made. In step 102, various kinds of sensor signals (detected signals) are read. In step 103, actual self-aligning torque Tsaa is estimated as follows on the basis of the read sensor signals. FIG. 6 shows the configuration of the self-aligning torque estimating unit M6 for estimating actual self-aligning torque Tsaa. The self-aligning torque estimating unit M6 includes a map calculation unit M16, and a pre-correction self-aligning torque estimating unit M17.

In this embodiment, an electric power steering apparatus is provided as shown in FIG. 13. As described above, the electric power steering apparatus is formed so that steering torque Tstr acting on a steering shaft 2 in accordance with a steering operation is detected by a steering torque sensor TS, and that an EPS motor 3 is controlled in accordance with the detected value of steering torque Tstr to thereby relieve the driver's steering effort.

In this case, self-aligning torque generated in tires of the front wheels balances with torque obtained by subtracting a steering friction component from the sum of steering torque based on the steering operation and assist torque output from the electric power steering apparatus.

For this reason, self-aligning torque Tsaa* can be calculated in accordance with the expression Tsaa*=Tstr+Teps−Tfrc by the pre-correction self-aligning torque estimating unit M17. In the expression, Tstr is torque (steering torque) which acts on the steering shaft in accordance with the driver's steering operation and which can be detected by the steering torque sensor TS as described above. Teps is assist torque output from the electric power steering apparatus. For example, this can be estimated on the basis of the value of a motor current (motor current value) of the ESP motor 3 as a constituent member of the electric power steering apparatus because the motor current value has a predetermined relation with motor output torque (assist torque) (i.e. motor output torque is approximately proportional to the motor current value).

In the aforementioned expression, Tfrc is a steering friction component, that is, a torque component (friction torque) caused by friction of the steering system. In this embodiment, Tfrc is subtracted from the sum (Tstr+Teps) so that self-aligning torque Tsaa* can be calculated while the friction component is removed.

Figure 26:
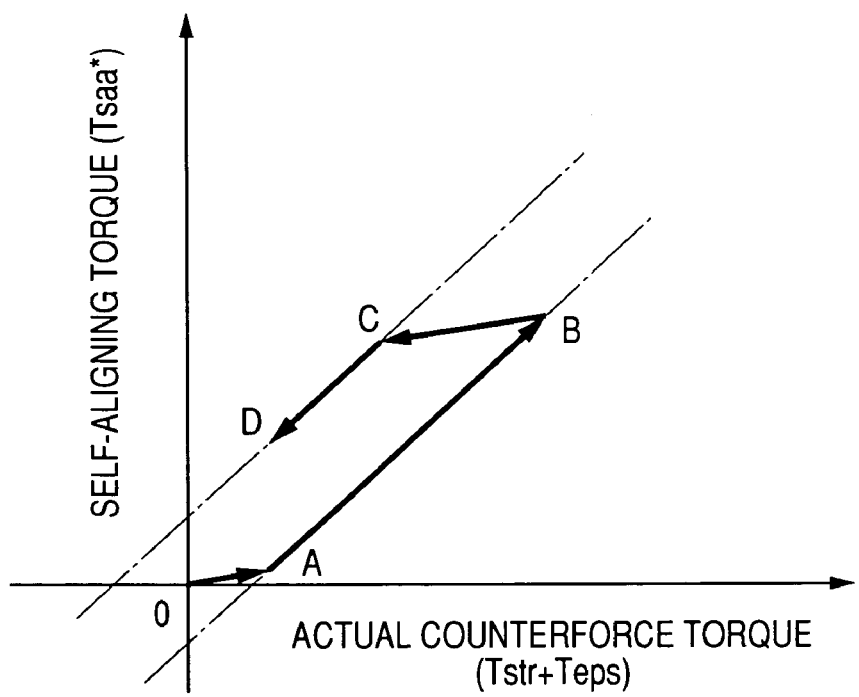
FIG. 26 is a graph showing characteristic of a steering friction component used for correction at the time of estimation of self-aligning torque in the embodiment of the invention.

The removing method will be described below with reference to FIG. 26. FIG. 26 shows a [self-aligning torque]–[actual counterforce torque] map stored in the ROM of ECU1. ECU1 calculates self-aligning torque Tsaa* on the basis of this map.

In the case of straight traveling, the actual counterforce torque (Tstr+Teps) is zero. When the driver starts a steering operation to turn the steering wheel, actual counterforce torque begins to be generated. On this occasion, torque for canceling Coulomb friction of a steering mechanism (not shown) is first generated. Then, self-aligning torque is generated when the front wheels (tires) FL and FR in the front of the vehicle begin to turn.

Accordingly, in the initial stage of the steering operation applied to the straight traveling state, self-aligning torque against increase in actual counterforce torque has not been generated yet as represented by the segment O-A in FIG. 26. For this reason, the estimated value of self-aligning torque is output as self-aligning torque Tsaa* (which is accurately an estimated value after removal of the friction component but the words "estimated value" are omitted) in accordance with a slight gradient with respect to the actual counterforce torque. When the steering wheel is further turned so that the actual counterforce torque exceeds the friction torque region, self-aligning torque Tsaa* is output along the segment A-B in FIG. 26. When the steering wheel is turned back so that the actual counterforce torque is reduced, self-aligning torque Tsaa* is output in the form of a slight gradient as represented by the segment B-C in FIG. 26. When the steering wheel is further turned back so that the actual counterforce torque exceeds the friction torque region in the same manner as the steering wheel is further turned, self-aligning torque Tsaa* is output along the segment C-D in FIG. 26.

Next, the map calculation unit M16, the longitudinal force estimating unit M15 and the distribution setting unit M14 will be described. First, the map calculation unit M16 will be described.

When braking or driving force is applied on the wheels, the self-aligning torque Tsaa* is affected by the braking or driving force. The calculated self-aligning torque Tsaa* is self-aligning torque affected by the braking or driving force and may be hereinafter referred to as "pre-correction self-aligning torque".

When, for example, braking force is applied, the self-aligning torque Tsaa* may be lower than the actual self-aligning torque in accordance with the size of the front wheel slip angle. In this case, the grip factor is output as a lower value when the grip factor is calculated on the basis of the self-aligning torque Tsaa* affected by the braking force. On the contrary, when driving force is applied on the wheels, the self-aligning torque Tsaa* may be higher than the actual self-aligning torque in accordance with the size of the front wheel slip angle.

Figure 5:
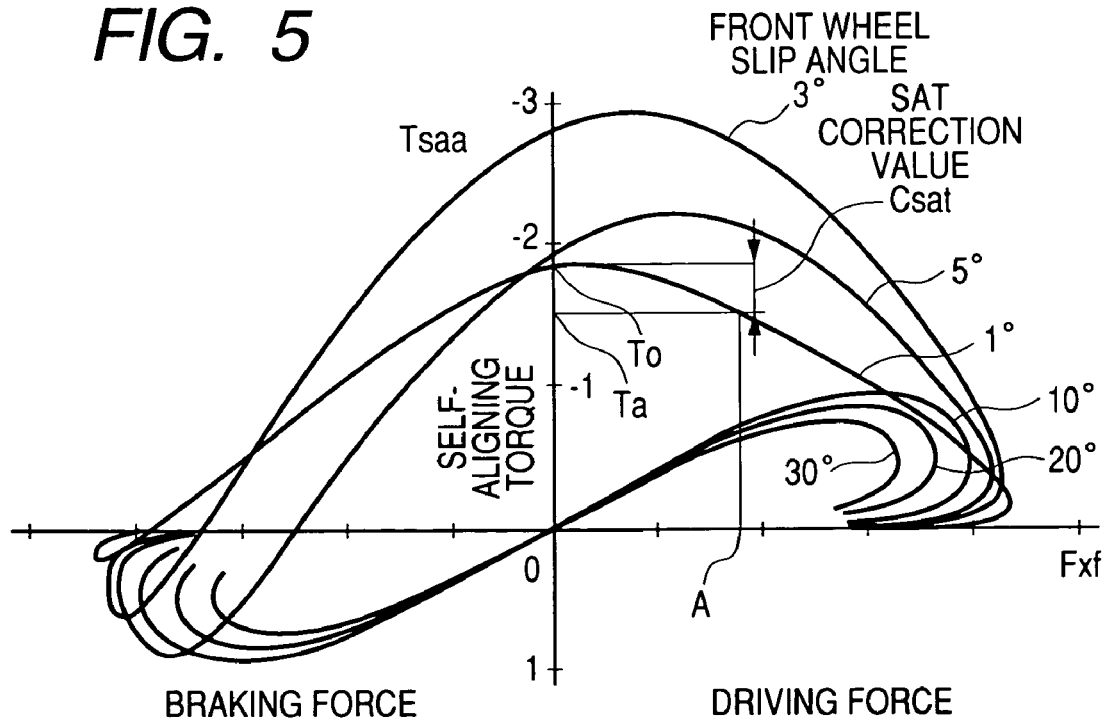
FIG. 5 is a graph for explaining a map used by a map calculation unit M16.

Therefore, the influence of the braking or driving force is removed by the map calculation unit M16. FIG. 5 shows a map which expresses the relation between the braking or driving force and the self-aligning torque and which is used by the map calculation unit M16. The map is stored in the storage unit such as the ROM in the steering control unit ECU1. Incidentally, the map is obtained experimentally in advance. In FIG. 5, change in self-aligning torque due to the driving force is expressed on the right side from zero on the horizontal axis while change in self-aligning torque due to the braking force is expressed on the left side from zero on the horizontal axis. When the lateral slip angle changes to 1°, 3°, 5°, 10°, 20° and 30° successively in FIG. 5, self-aligning torque changes as shown in FIG. 5.

The map calculation unit M16 calculates an SAT correction value Csat (self-aligning torque correction value) as the quantity of influence on the basis of the front wheel longitudinal force Fxf and front wheel slip angle αf input from the longitudinal force estimating unit M15 and front wheel slip angle estimating unit M9y while referring to the map.

The SAT correction value Csat is calculated and obtained as the difference between self-aligning torque of the front wheel longitudinal force Fxf (driving or braking force) at the front wheel slip angle αf and self-aligning torque in the case where the front wheel longitudinal force Fxf (driving or braking force) at the front wheel slip angle αf is zero. In the example shown in FIG. 5, there is expressed the difference between self-aligning torque Ta (at a front wheel slip angle of 1°) in the case of driving force A and self-aligning torque T0 (at a front wheel slip angle of 1°) in the case of front wheel longitudinal force Fxf of zero.

Next, the way of calculating the front wheel longitudinal force Fxf by the longitudinal force estimating unit M15 will be described.

The longitudinal force estimating unit M15 estimates the front wheel longitudinal force Fxf on the basis of the longitudinal acceleration Gx, the vehicle weight W and the distribution ratio δ concerning the longitudinal driving or braking force distribution set by the distribution setting unit M14. Specifically, the front wheel longitudinal force Fxf is given by the following expression.

$$Fxf = W \cdot Gx \cdot \delta$$

When the longitudinal acceleration Gx is positive, the front wheel longitudinal force Fxf is obtained as driving force. When the longitudinal acceleration Gx is negative, the front wheel longitudinal force Fxf is obtained as braking force.

Next, the distribution setting unit M14 will be described.

In this embodiment, because the vehicle is of a front wheel drive type, the distribution setting unit M14 reads the distribution ratio δ set as a fixed value from the storage unit such as an ROM when driving force is applied. Incidentally, if the vehicle is of a four wheel drive type having a driving force distributor, the distribution ratio is set in accordance with the front wheel side driving force distribution calculated by the distributor when driving force is applied on the front wheels. When braking force is applied on the front wheels, the distribution setting unit M14 sets the distribution ratio δ of braking force applied on the front wheels in accordance with the ratio of the quantity of braking applied on the front wheels by ECU2 of the brake control system to the quantity of braking applied on the rear wheels by ECU2 of the brake control system.

After the SAT correction value Csat is calculated by the map calculation unit M16 in the aforementioned manner, the SAT correction value Csat is subtracted from the pre-correction self-aligning torque (self-aligning torque Tsaa*) estimated by the pre-correction self-aligning torque estimating unit M17. In this manner, actual self-aligning torque Tsaa is calculated. The calculated value of Tsaa is supplied to the grip factor estimating unit M12.

Referring back to FIG. 16, in step 104, reference self-aligning torque (Tsao) is calculated in the aforementioned manner. In step 105, the grip factor ε is estimated in the aforementioned manner. In step 106, the grip factor ε is compared with a first predetermined value ε0. The first predetermined value ε0 is a judgment value for judging whether the grip factor is low or not. When the grip factor ε is lower than the first predetermined value ε0, a decision is made that the grip factor is low. In this case, in step 107, the driver is alarmed of the fact that the grip factor is low. A unit for displaying an indicator or generating voice is used as the alarm unit. Configuration may be made so that voice for urging the driver to loose the accelerating operation or make the braking operation is output. When the grip factor ε is not lower than the first predetermined value ε0, the current position of the routine goes back to the step 102.

Figure 17:
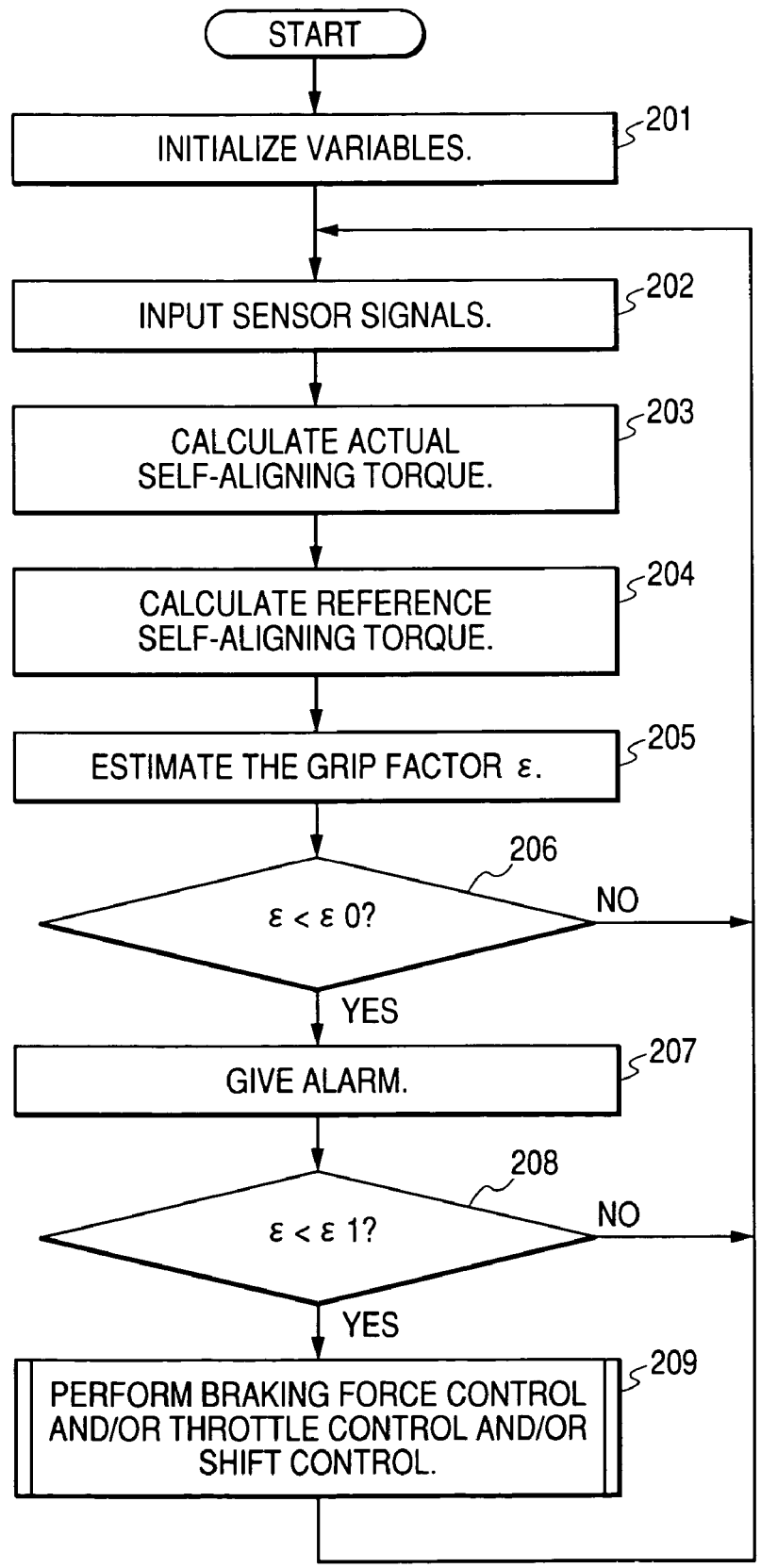
FIG. 17 is a flow chart showing processing in the case where braking force control or the like is performed in addition to alarming when the grip factor is lowered in the embodiment of the invention.

FIG. 17 shows the case where braking force control for reducing the velocity of the vehicle and/or throttle control and/or shift control are added to the aforementioned processing. The description of steps 201 to 207 will be omitted because the steps 201 to 207 are the same as the steps 101 to 107 in FIG. 16. When a decision is made in step 206 that the grip factor ε is lower than the first predetermined value ε0, the current position of the routine proceeds to step 207 in which the driver is alarmed. Then, in step 208, the grip factor ε is compared with a second predetermined value ε1 (<ε0). The second predetermined value ε1 is a judgment value for performing at least one of braking force control, throttle control and shift control. When a decision is made in step 208 that the grip factor ε is lower than the second predetermined value ε1, the current position of the routine proceeds to step 209 in which at least one of braking force control, throttle control and shift control is performed.

For example, in braking force control, braking force is applied on at least one wheel to reduce the velocity of the vehicle even in the case where the driver does not carry out any braking operation. Also in throttle control, the throttle is controlled to be closed to reduce the velocity of the vehicle. In shift control, the gear shift position is changed in a velocity reducing direction to perform a shift-down operation.

Figure 18:
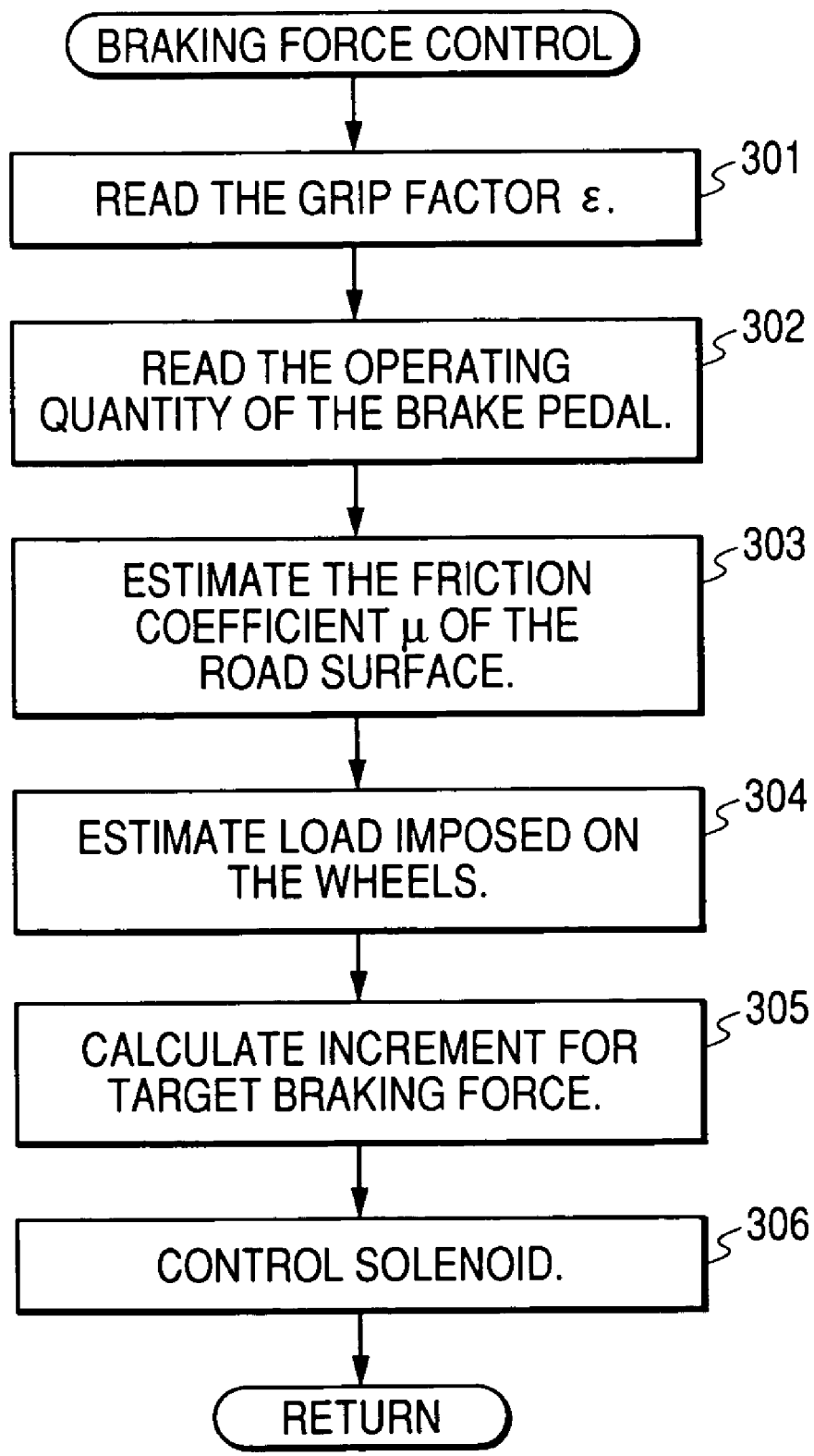
FIG. 18 is a flow chart showing an example of the braking force control in FIG. 17.

FIG. 18 is a flow chart showing an example of the braking force control as one of the aforementioned controls. The flow chart is executed by the CPU of the brake control unit ECU2 as a constituent member of the electronic control unit ECU. First, in step 301, the grip factor ε is read. In step 302, the driver's brake pedal operating quantity (the value detected by the stroke sensor SR in FIG. 15) is read. Then, in step 303, the friction coefficient μ of the road surface is estimated. Braking force control based on the grip factor is executed when the grip factor is lowered to a certain degree (e.g. lower than the second predetermined value) in the same manner as described above (FIG. 17). Accordingly, the friction coefficient μ of the road surface can be estimated by use of the point of inflection (point P in FIG. 11) of actual self-aligning torque. The friction coefficient of the road surface can be estimated on the basis of the state variable such as self-aligning torque, front wheel slip angle, side force or lateral acceleration when there is a point of inflection of actual self-aligning torque.

Then, the current position of the routine proceeds to step 304 in which vertical load (wheel load) imposed on each wheel is calculated on the basis of the lateral acceleration (the value detected by the lateral acceleration sensor YG) and the longitudinal acceleration (the value detected by the longitudinal acceleration sensor XG). In step 305, increment for target braking force of each wheel is set on the basis of results of the aforementioned estimation and calculation, that is, on the basis of the driver's brake pedal operating quantity, the grip factor ε, the friction coefficient μ of the road surface and the wheel load. In step 306, solenoid valves (represented by SL) in FIG. 15 are controlled on the basis of the target braking force after addition of the increment for target braking force, so that the following braking force control is performed.

Figure 19:
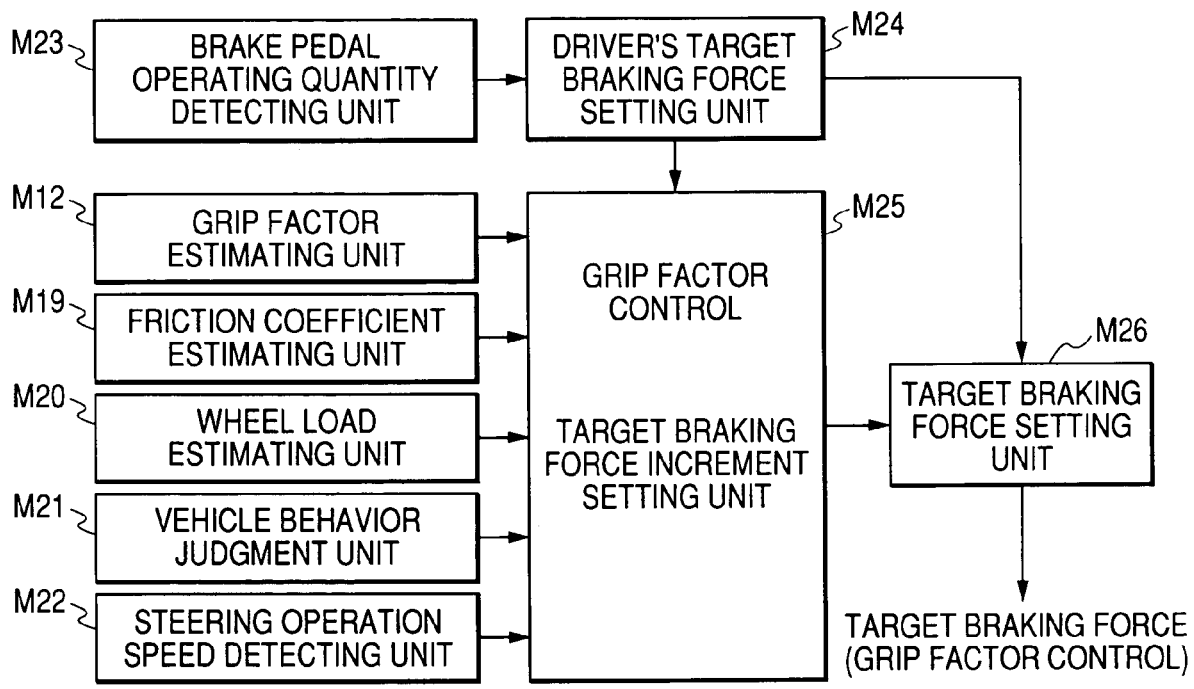
FIG. 19 is a block diagram showing braking force control based on the grip factor in the embodiment of the invention.

FIG. 19 is a block diagram of braking force control based on the grip factor. Increment for braking force based on the grip factor is set on the basis of the driver's brake pedal operating quantity or the driver's target braking force, the estimated value of the grip factor, the estimated value of the friction coefficient of the road surface, the estimated value of the wheel load, the result of judgment of the vehicle behavior and the driver's steering operation speed. The grip factor is estimated by the grip factor estimating unit M12 (the same as in FIG. 1). The friction coefficient of the road surface is estimated by the friction coefficient estimating unit M19 on the basis of the point of inflection (point P in FIG. 11) of actual self-aligning torque in the aforementioned manner. The wheel load is estimated by the wheel load estimating unit M20 in the aforementioned manner (step 304). The vehicle behavior is estimated by a vehicle behavior judgment unit M21 as will be described later. The driver's steering operation speed (steering wheel operating speed) is detected by a steering operation speed detecting unit M22. For example, the quantity of change in the steering angle signal detected by the steering angle sensor SS in FIG. 13 with respect to time is calculated. The driver's brake pedal operating quantity is detected by a brake pedal operating quantity detecting unit M23 (e.g. the stroke sensor SR in FIG. 15).

The friction coefficient estimating unit M19, the wheel load estimating unit M20, the vehicle behavior judgment unit M21 and the steering operation speed detecting unit M22 are constituted by the electronic control unit ECU (brake control unit ECU2).

The driver's target braking force is set by a driver's target braking force setting unit M24 on the basis of an output detected by the brake pedal operating quantity detecting unit M23. Increment for target braking force is set by a target braking force increment setting unit M25 on the basis of a result of the setting of the driver's target braking force and results detected by the unit M12 to M22. The target value of braking force for each wheel is decided by a target braking force setting unit M26 in such a manner that the increment for target braking force is added to the driver's target braking force. The braking force control based on the grip factor is executed even in the case where the driver does not carry out any braking operation. For this reason, even in the case where the vehicle enters a curve in the condition that the velocity of the vehicle is excessive with respect to the radius of turning, the vehicle can pass through the curve while the radius of turning is retained because the vehicle is braked automatically on the basis of the grip factor of the front wheels.

The driver's target braking force setting unit M24, the target braking force increment setting unit M25 and the target braking force setting unit M26 are constituted by the electronic control unit ECU (brake control unit ECU2).

Figure 20:
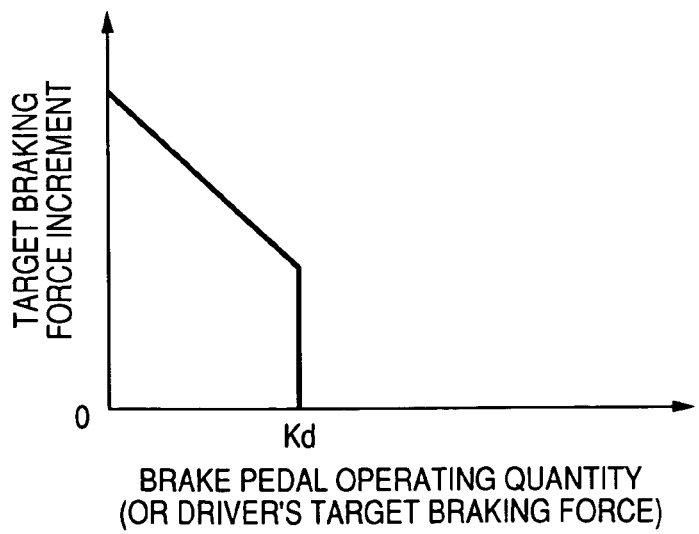
FIG. 20 is a graph showing a map of target braking force increment corresponding to the driver's brake pedal operating quantity in the embodiment of the invention.

The increment for target braking force in the braking force control based on the grip factor is set on the basis of the following condition. FIG. 20 shows a map of the increment for target braking force in accordance with the driver's brake pedal operating quantity (or driver's target braking force). When the driver has already made a braking operation not lower than a predetermined value (Kd), the braking operation is executed in accordance with necessity of braking or the grip factor is lowered because of the braking. Accordingly, when the brake pedal operating quantity (or driver's target braking force) is not lower than the predetermined value (Kd), the increment for target braking force is set at zero.

Figure 21:
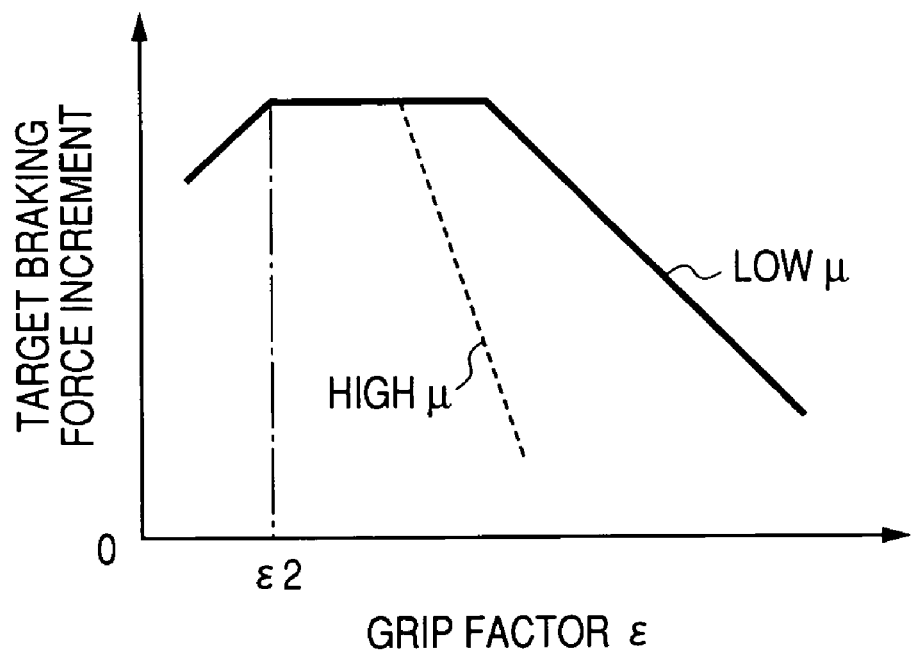
FIG. 21 is a graph showing a map of target braking force increment with respect to the grip factor in the embodiment of the invention.

FIG. 21 shows a map of the increment for target braking force with respect to the grip factor $\epsilon$. The increment for target braking force is set so that the increment increases as the grip factor $\epsilon$ decreases. However, when the grip factor $\epsilon$ is lower than a predetermined value ($\epsilon 2$), the increment for target braking force is set so as to be suppressed because increase in braking force will cause further reduction in the grip factor if the grip factor $\epsilon$ is too low. The threshold of the grip factor $\epsilon$ for starting braking force control in the case where the friction coefficient $\mu$ of the road surface is low (as represented by the solid line in FIG. 21) is set to be higher than the threshold of the grip factor $\epsilon$ for starting braking force control in the case where the friction coefficient $\mu$ of the road surface is high (as represented by the broken line in FIG. 21). That is, when the friction coefficient $\mu$ of the road surface is low, the threshold of the grip factor $\epsilon$ is set so that control starts at a state in which the grip factor $\epsilon$ is higher. Moreover, when the friction coefficient $\mu$ of the road surface is low, the rate of change in increment for target braking force to the grip factor $\epsilon$ is preferably set to be low so that the behavior changes slowly.

Figure 22:
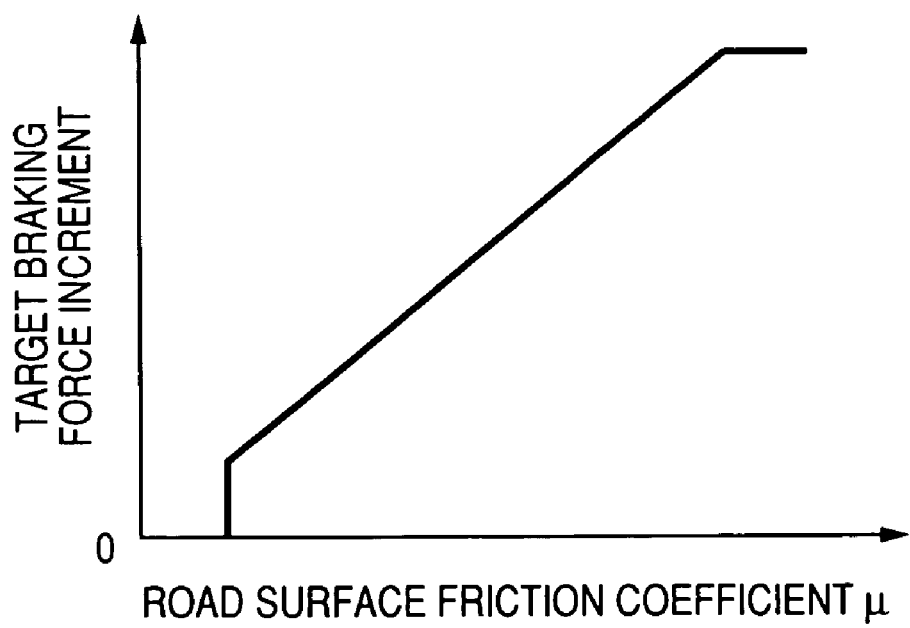
FIG. 22 is a graph showing a map of target braking force increment with respect to the friction coefficient of the road surface in the embodiment of the invention.
Figure 23:
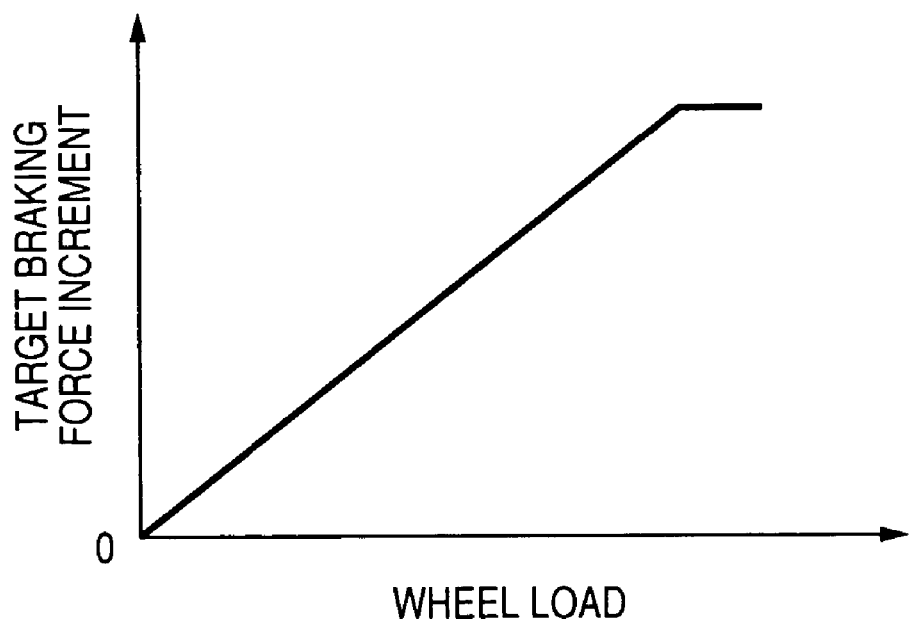
FIG. 23 is a graph showing a map of target braking force increment with respect to the wheel load in the embodiment of the invention.

FIG. 22 shows a map of the increment for target braking force with respect to the friction coefficient $\mu$ of the road surface. FIG. 23 shows a map of the increment for target braking force with respect to the wheel load. As is obvious from FIGS. 22 and 23, the increment for target braking force is set so that the increment increases as the friction coefficient $\mu$ of the road surface increases and as the wheel load increases. Braking force characteristic of each wheel is decided on the basis of the wheel load and the friction coefficient of the road surface. An upper limit of the increment for target braking force is set so that the "slip region" (see FIG. 2) of wheel slip does not become excessive, that is, braking force control is executed in a predetermined range of the "adhesive region".

Figure 24:
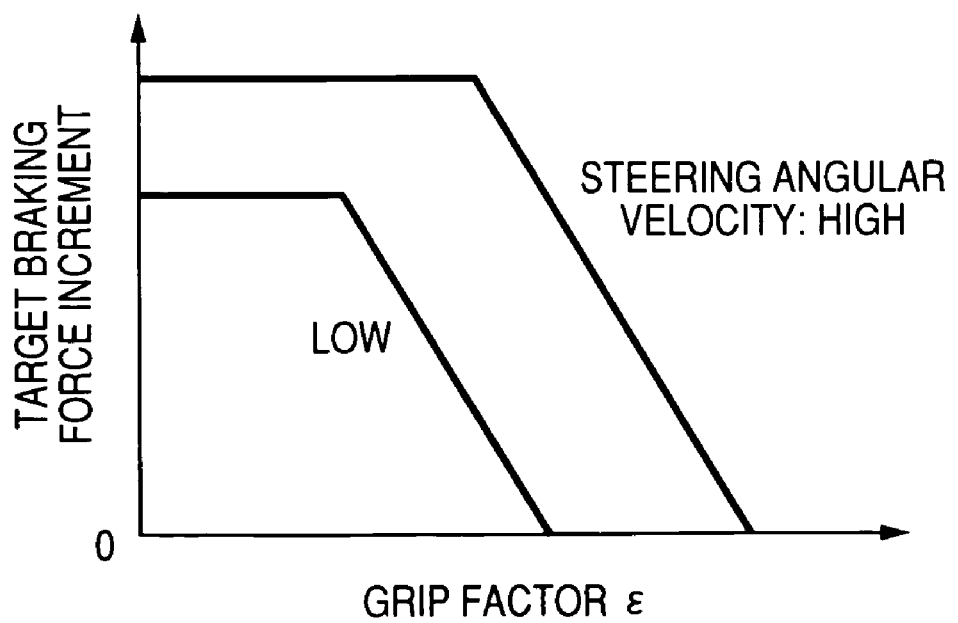
FIG. 24 is a graph showing a map of target braking force increment based on the driver's steering operation speed and the grip factor in the embodiment of the invention.

FIG. 24 shows a map of the increment for target braking force on the basis of the driver's steering operation speed and the grip factor. Incidentally, the driver's steering operation speed (steering wheel operating speed) is calculated and obtained as the quantity of change in steering angle signal (signal detected by the steering angle sensor SS) with respect to time as described above. That is, when the steering operation speed is high, the increment for target braking force is set so that braking force control starts at a point where the grip factor is higher because case of emergency such as case of avoidance of an obstacle is predicted. Moreover, when the steering operation speed is high, the increment for target braking force is set at a high value so that sufficient velocity reduction can be obtained.

Incidentally, as the vehicle is generally designed to show weak under-steering characteristic, there is a first limit to the front wheels. Accordingly, when braking force control is performed, braking force control may be preferably performed for at least one wheel so that velocity can be reduced while total side force can be retained to keep the yaw moment acting inwardly on turning and the radius of turning. As an example of braking force control, it may be conceived that the number of wheels to be braked increases in order of the rear wheel in the inside of turning, the rear wheel in the outside of turning and the front wheel in the outside of turning in accordance with the grip factor. Or the rear wheel in the inside of turning, the rear wheel in the outside of turning and the front wheel in the outside of turning may be controlled simultaneously. When the road surface has a high friction coefficient, only the rear wheels may be controlled because sufficient velocity reduction can be obtained easily. When the friction coefficient of the road surface is very low, that is, when the friction coefficient of the road surface is lower than a predetermined value which is a judgment value for judging that the friction coefficient of the road surface is very low, it is however preferable that braking force control (increase in braking force) for the rear wheels is prohibited because the vehicle may get into a tendency toward over-steering suddenly.

Figure 25:
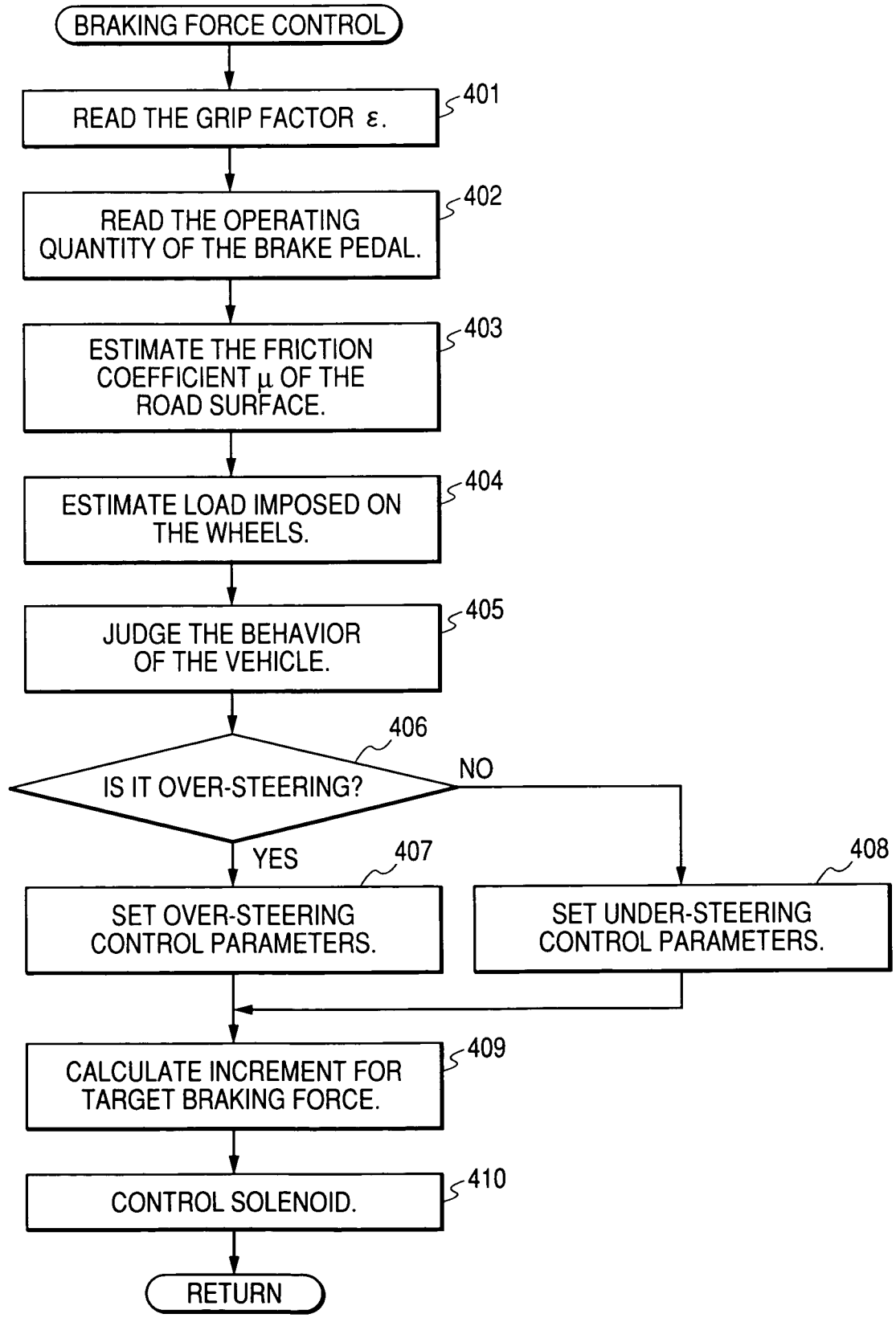
FIG. 25 is a flow chart showing another example of braking force control in the embodiment of the invention.

In a steady state, the vehicle shows under-steering characteristic. In transitional steering such as slalom or lane change or in change in friction coefficient of the road surface, the vehicle however may show a tendency toward over-steering. FIG. 25 shows control in accordance with this case. The description of steps 401 to 404 will be omitted because the steps 401 to 404 are the same as the steps 301 to 304 in FIG. 18. In step 405, the behavior of the vehicle is decided to make a judgment as to whether the vehicle shows a tendency toward under-steering or a tendency toward over-steering. When a decision is made in step 406 that the vehicle shows a tendency toward over-steering on the basis of a result of the judgment, the current position of the routine proceeds to step 407 in which over-steering control parameters are set so that yaw moment can be generated outwardly on turning by increase in braking force to thereby reduce velocity. When a decision is made in step 406 that the vehicle does not show a tendency toward over-steering, the current position of the routine proceeds to step 408 in which under-steering control parameters are set so that velocity can be reduced while yaw moment generated inwardly on turning can be kept capable of tracing the radius of turning. Consequently, in step 409, increment for target braking force is decided on the basis of these control parameters. In step 410, braking force control is performed.

4. Other Embodiments of Grip Factor Estimating Apparatus and Vehicle Motion Control Apparatus In the grip factor estimating apparatus and the vehicle motion control apparatus according to the aforementioned embodiments, attention is paid to change in pneumatic trail of tires, so that the grip factor $\epsilon$ is calculated on the basis of self-aligning torque. The grip factor estimating apparatus and the vehicle motion control apparatus, however, may be achieved specifically as follows.

That is, the grip factor (designated by $\epsilon m$ in this case) expressing the degree of lateral grip for wheels can be estimated on the basis of the allowance of side force with respect to the friction of the road surface as follows.

First, according to a theoretical model of force generated in each tire (brush model), the relation between front wheel side force Fyf and actual self-aligning torque Tsaa is given by the following expressions:

$$\text{in case of } \xi > 0, \; Fyf = \mu \cdot Fz \cdot (1 - \xi^3) \quad (1);$$

$$\text{in case of } \xi \leq 0, \; Fyf = \mu \cdot Fz \quad (2);$$

$$\text{in case of } \xi > 0, \; Tsaa = (l \cdot Ks/6) \cdot \lambda \cdot \xi^3 \quad (3); \text{ and}$$

$$\text{in case of } \xi \leq 0, \; Tsaa = 0 \quad (4),$$

in which $\xi$ is a value satisfying the expression $\xi = 1 - \{Ks/(3 \cdot \mu \cdot Fz)\} \cdot \lambda$, Fz is a ground contact load, "l" is the ground contact length of the ground contact surface of the tire, Ks is a constant corresponding to tread rigidity, $\lambda$ is a lateral slip ($\lambda = \tan(\alpha f)$), and $\alpha f$ is a front wheel slip angle.

Incidentally, the symbol "^" expresses the power of a number. Accordingly, "^3" expresses the power of 3.

Generally, in a region of $\xi > 0$, the lateral slip $\lambda$ can be regarded as $\lambda = \alpha f$ because the front wheel slip angle $\alpha f$ is sufficiently small. As is obvious from the expression (1), the maximum of side force is $\mu \cdot Fz$. Accordingly, when the rate of side force corresponding to the friction coefficient $\mu$ of the road surface to the maximum is defined as road surface friction activity ratio $\eta$, the road surface friction activity ratio $\eta$ can be given by the expression $\eta = 1 - \xi^3$. Accordingly, $\epsilon m = 1 - \eta$ can be expressed as allowance of road surface friction. When $\epsilon m$ is regarded as the grip factor of each wheel, the expression $\epsilon m = \xi^3$ can be obtained. Accordingly, the expression (3) can be given as follows.

$$Tsaa = (l \cdot Ks/6) \cdot \alpha f \cdot \epsilon m \quad (5)$$

The expression (5) shows that actual self-aligning torque Tsaa is proportional both to the front wheel slip angle $\alpha f$ and to the grip factor $\epsilon m$. Accordingly, when characteristic in the case where the grip factor $\epsilon m$ is equal to 1 (the road surface friction activity ratio is zero, that is, the allowance of friction is 1) is regarded as reference self-aligning torque characteristic, the characteristic is given as follows.

$$Tsau = (l \cdot Ks/6) \cdot \alpha f \quad (6)$$

Accordingly, the grip factor $\epsilon m$ can be calculated as follows on the basis of the expressions (5) and (6).

$$\epsilon m = Tsaa/Tsau \quad (7)$$

As is obvious from the fact that the expression (7) does not contain the friction coefficient $\mu$ of the road surface as a parameter, the grip factor $\epsilon m$ can be calculated without use of the friction coefficient $\mu$ of the road surface. In this case, the gradient K4 ($=l \cdot Ks/6$) of the reference self-aligning torque Tsau can be set in advance by use of the aforementioned brush model. Or the gradient K4 can be measured experimentally. If the initial value of the gradient K4 is set in advance and the gradient of self-aligning torque at a point near a front wheel slip angle of zero is specified and corrected during traveling, accuracy in detection can be improved.

Figure 27:
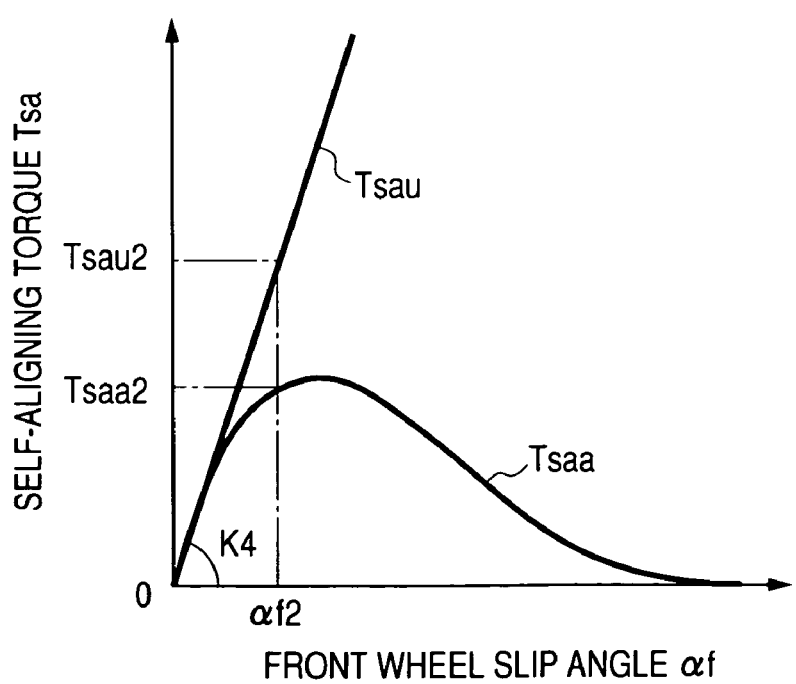
FIG. 27 is a graph showing the relation of self-aligning torque versus front wheel slip angle in another embodiment of the invention.

When, for example, the front wheel slip angle in FIG. 27 is $\alpha f2$, reference self-aligning torque Tsau2 is calculated in accordance with the expression Tsau2=K4·$\alpha f2$. The grip factor $\epsilon m$ is calculated in accordance with the expression $\epsilon m$=Tsaa2/Tsau2=Tsaa2/(K4·$\alpha f2$).

Figure 28:
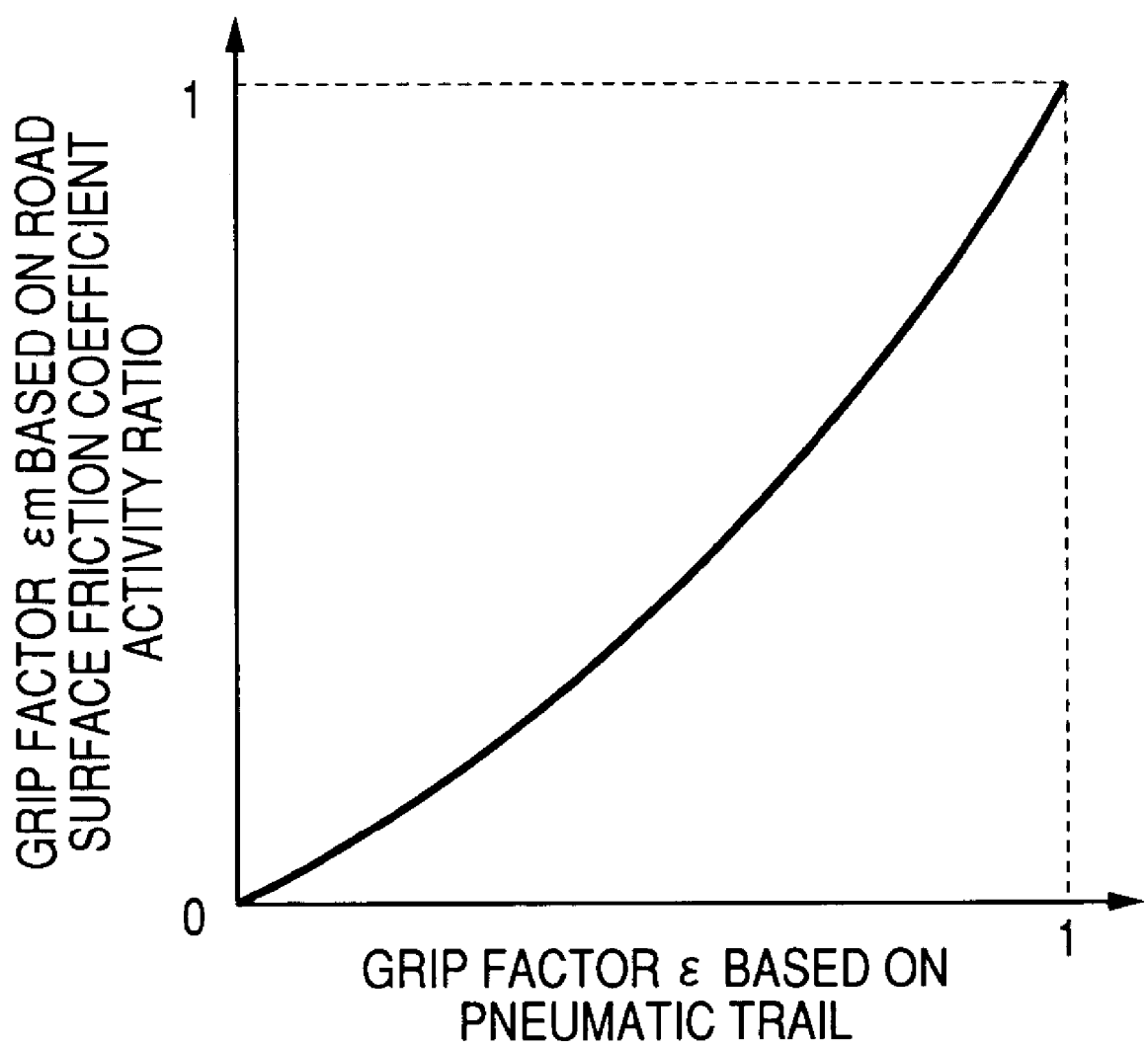
FIG. 28 is a graph showing the relation between the grip factor $\epsilon$ based on the pneumatic trail and the grip factor $\epsilon m$ based on the allowance of the road surface friction in the invention.

In this manner, the grip factor $\epsilon$ based on the pneumatic trail shown in FIGS. 16-25 can be replaced by the grip factor $\epsilon m$ based on the allowance of the road surface friction. The grip factor $\epsilon$ and the grip factor $\epsilon m$ have the relation shown in FIG. 28. Accordingly, the grip factor $\epsilon$ can be calculated and converted into the grip factor $\epsilon m$. Conversely, the grip factor $\epsilon m$ can be calculated and converted into the grip factor $\epsilon$.

Hereinafter, the advantages obtained by the present invention will be described.

(1) The invention provides an apparatus of estimating the grip factor of wheels, having: a steering factor detecting unit for detecting at least one of steering factors including steering torque and steering effort applied on a steering system extending from a steering wheel to a suspension in a vehicle; a longitudinal force estimating unit for estimating driving or braking force of wheels in the front of the vehicle (hereinafter referred to as front wheels); a self-aligning torque estimating unit for estimating self-aligning torque generated in the front wheels on the basis of a signal detected by the steering factor detecting unit and for estimating the quantity of influence of the driving or braking force estimated by the longitudinal force estimating unit on the self-aligning torque to thereby estimate a value obtained by removing the quantity of influence from the self-aligning torque as new self-aligning torque; a vehicle state variable detecting unit for detecting the state variable of the vehicle; a wheel factor estimating unit for estimating at least one of front wheel factors including side force and front wheel slip angle applied on the front wheels on the basis of a signal detected by the vehicle state variable detecting unit; and a grip factor estimating unit for estimating the grip factor of at least the front wheels on the basis of change of the self-aligning torque newly estimated by the self-aligning torque estimating unit relative to the wheel factor estimated by the wheel factor estimating unit.

According to the above configuration, the self-aligning torque of front wheels is estimated, for example, on the basis of steering torque due to the steering wheel or steering effort given to the suspension. Further, the quantity of influence of the driving or braking force estimated by the longitudinal force estimating unit on the self-aligning torque is estimated. A value obtained by removing the quantity of influence from the self-aligning torque is estimated as new self-aligning torque.

Further, side force or slip angle of the front wheels is estimated on the basis of the state variable of the vehicle. The grip factor of the front wheels is estimated on the basis of change in self-aligning torque relative to the side force or slip angle of the front wheels. Incidentally, the state variable of the vehicle includes indices concerning the traveling vehicle, such as the velocity, lateral acceleration, yaw rate, steering angle, etc. in the vehicle.

(2) Preferably, the apparatus may further have a reference self-aligning torque setting unit for setting reference self-aligning torque on the basis of the wheel factor estimated by the wheel factor estimating unit and the self-aligning torque estimated by the self-aligning torque estimating unit, wherein the grip factor estimating unit estimates the grip factor of at least the front wheels on the basis of a result of comparison between the reference self-aligning torque set by the reference self-aligning torque setting unit and the self-aligning torque estimated by the self-aligning torque estimating unit.

(3) Configuration may be made so that the reference self-aligning torque setting unit sets reference self-aligning torque characteristic obtained by approximating characteristic of the self-aligning torque estimated by the self-aligning torque estimating unit relative to the wheel factor estimated by the wheel factor estimating unit to a linearity including at least an origin and sets the reference self-aligning torque on the basis of the reference self-aligning torque characteristic.

(4) Or configuration may be made so that the reference self-aligning torque setting unit sets linear reference self-aligning torque characteristic having a gradient set on the basis of a brush model for the front wheels and sets the reference self-aligning torque on the basis of the reference self-aligning torque characteristic.

(5) The apparatus may further have an alarming unit for comparing the grip factor estimated by the grip factor estimating unit with a first predetermined value and alarming a driver of the vehicle when the grip factor is lower than the first predetermined value.

(6) The invention also provides an apparatus of controlling the motion of a vehicle, having: an apparatus of estimating the grip factor of wheels as defined in (1); and a control unit for controlling at least one of braking force, engine output and gear shift position applied on the vehicle in accordance with a signal detected by at least the vehicle state variable detecting unit, wherein the control unit controls at least one of braking force, engine output and gear shift position applied on the vehicle to reduce the speed of the vehicle when the grip factor estimated by the grip factor estimating unit is lower than a second predetermined value.

(7) Preferably, the vehicle motion control apparatus may further have a reference self-aligning torque setting unit for setting reference self-aligning torque on the basis of the wheel factor estimated by the wheel factor estimating unit and the self-aligning torque estimated by the self-aligning torque estimating unit, wherein the grip factor estimating unit estimates the grip factor of at least the front wheels on the basis of a result of comparison between the reference self-aligning torque set by the reference self-aligning torque setting unit and the self-aligning torque estimated by the self-aligning torque estimating unit.

(8) Configuration may be made so that the reference self-aligning torque setting unit sets reference self-aligning torque characteristic obtained by approximating characteristic of the self-aligning torque estimated by the self-aligning torque estimating unit relative to the wheel factor estimated by the wheel factor estimating unit to a linearity including at least an origin and sets the reference self-aligning torque on the basis of the reference self-aligning torque characteristic.

(9) Or configuration may be made so that the reference self-aligning torque setting unit sets linear reference self-aligning torque characteristic having a gradient set on the basis of a brush model for the front wheels and sets the reference self-aligning torque on the basis of the reference self-aligning torque characteristic.

(10) Preferably, the control unit may control braking force applied to at least one wheel of the vehicle to be not lower than a predetermined braking force irrespective of a braking operation executed by the driver of the vehicle when the grip factor estimated by the grip factor estimating unit is lower than the second predetermined value during the braking operation executed by the driver of the vehicle.

(11) The predetermined braking force used in the braking force control executed by the control unit may be set on the basis of at least one of the quantity of operation of a braking pedal in the vehicle, the grip factor, the friction coefficient of a road surface for the wheels and the load imposed on the wheels.

(12) Or the control unit may perform controlling to prohibit braking force for wheels in the rear of the vehicle from increasing when the friction coefficient of the road surface is lower than a predetermined value.

(13) In the vehicle motion control apparatus as defined in (10), the control unit may make a judgment on the basis of a signal detected by the vehicle state variable detecting unit as to whether the vehicle is in a state having a tendency to under-steering or a tendency to over-steering, so that the control unit controls braking force to change yaw moment generated in the vehicle in accordance with the judgment as to whether the vehicle is in a state having a tendency to under-steering or a tendency to over-steering.

The configurations as described above has the following advantages.

That is, according to the wheel grip factor estimating apparatus described in (1), self-aligning torque of front wheels is estimated on the basis of a steering factor and a wheel factor is estimated on the basis of the state variable of the vehicle, so that the grip factor indicating the degree of lateral grip of the front wheels can be estimated accurately on the basis of change in self-aligning torque relative to the wheel factor. As a result, the apparatus can estimate the grip factor accurately under the consideration of tire characteristic of the front wheels. Moreover, because the influence of braking or driving force acting on the front wheels on the self-aligning torque is removed, the self-aligning torque can be estimated accurately. As a result, various kinds of control such as braking force control, throttle control, shift control, etc. can be executed surely.

As in (2), the reference self-aligning torque setting unit is provided so that the grip factor can be estimated easily and accurately on the basis of a result of comparison between self-aligning torque estimated by the self-aligning torque estimating unit and reference self-aligning torque when change in self-aligning torque is judged. Incidentally, the reference self-aligning torque setting unit can be formed easily as described in (3) or (4).

When the alarm unit is provided as described in (5), the driver can be alarmed of the fact that the grip factor is lower than the first predetermined value. Accordingly, the driver can take appropriate measures before the grip factor is reduced excessively.

According to the vehicle motion control apparatus described in (6), the grip factor can be estimated accurately by the grip factor estimating apparatus. When the grip factor is reduced to be lower than the second predetermined value, appropriate motion control can be performed while tire characteristic of the front wheels is considered.

When the reference self-aligning torque setting unit is provided as described in (7), the grip factor can be estimated easily and accurately on the basis of a result of comparison between reference self-aligning torque and self-aligning torque estimated by the self-aligning torque estimating unit. Incidentally, the reference self-aligning torque setting unit can be formed easily as described in (8) or (9).

In the configuration described in (10), braking force applied to at least one wheel is controlled to be not smaller than a predetermined value irrespective of the driver's braking operation when the grip factor is reduced to be lower than a predetermined value during the driver's braking operation. Accordingly, the velocity of the vehicle can be reduced appropriately before the vehicle gets into an unstable state. The predetermined value of braking force in the braking force control in the case can be set on the basis of at least one of the brake pedal operating quantity, the grip factor, the friction coefficient of the road surface and the wheel load as described in (11).

In the configuration described in (12), increase in braking force for wheels in the rear of the vehicle is prohibited when the friction coefficient of the road surface is lower than a predetermined value. Accordingly, appropriate measures can be taken against sudden change to a tendency toward over-steering, so that a stable traveling state can be retained.

According to (13), braking force is controlled so that yaw moment generated varies in accordance with whether the vehicle shows a tendency to under-steering or a tendency to over-steering. As a result, even in the case where under-steering characteristic in a steady state changes to a tendency to over-steering because of change in the friction coefficient of the road surface, a stable traveling state can be retained by appropriate braking force control.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for estimating a grip factor of a wheel of a vehicle, the apparatus comprising:
   a steering factor detecting unit that detects at least one of steering factors including a steering torque and steering effort applied on a steering system extending from a steering wheel to a suspension in a vehicle;
   a longitudinal force estimating unit that estimates a driving or braking force of the wheel;
   a self-aligning torque estimating unit that estimates self-aligning torque generated in the wheel on the basis of the steering factor detected by the steering factor detecting unit, estimates a quantity of influence of the driving or braking force estimated by the longitudinal force estimating unit on the self-aligning torque, and estimates a value obtained by removing the quantity of influence from the self-aligning torque as new self-aligning torque;
   a vehicle state variable detecting unit that detects a state variable of the vehicle;
   a wheel factor estimating unit that estimates at least one of wheel factors including side force and slip angle applied on the wheel on the basis of the state variable detected by the vehicle state variable detecting unit; and
   a grip factor estimating unit that estimates a grip factor of the wheel on the basis of change of the self-aligning torque newly estimated by the self-aligning torque estimating unit relative to the wheel factor estimated by the wheel factor estimating unit.

2. The apparatus according to claim 1, further comprising a reference self-aligning torque setting unit that sets reference self-aligning torque on the basis of the wheel factor estimated by the wheel factor estimating unit and the self-aligning torque estimated by the self-aligning torque estimating unit,
   wherein the grip factor estimating unit estimates the grip factor of the wheel on the basis of a result of comparison between the reference self-aligning torque set by the reference self-aligning torque setting unit and the self-aligning torque estimated by the self-aligning torque estimating unit.

3. The apparatus according to claim 2, wherein the reference self-aligning torque setting unit sets a reference self-aligning torque characteristic obtained by approximating a characteristic of the self-aligning torque estimated by the self-aligning torque estimating unit relative to the wheel factor estimated by the wheel factor estimating unit linearly including an origin, and
   wherein the reference self-aligning torque setting unit sets the reference self-aligning torque on the basis of the reference self-aligning torque characteristic.

4. The apparatus according to claim 2, wherein the reference self-aligning torque setting unit sets a linear reference self-aligning torque characteristic having a gradient set on the basis of a brush model for the wheel, and
   wherein the reference self-aligning torque setting unit sets the reference self-aligning torque on the basis of the linear reference self-aligning torque characteristic.

5. The apparatus according to claim 2, further comprising an alarming unit that compares the grip factor estimated by the grip factor estimating unit with a predetermined value and alarms a driver of the vehicle when the grip factor is lower than the predetermined value.

6. The apparatus according to claim 1, further comprising an alarming unit that compares the grip factor estimated by the grip factor estimating unit with a predetermined value and alarms a driver of the vehicle when the grip factor is lower than the predetermined value.

7. A vehicle motion control apparatus comprising:
   a steering factor detecting unit that detects at least one of steering factors including a steering torque and steering effort applied on a steering system extending from a steering wheel to a suspension in a vehicle;
   a longitudinal force estimating unit that estimates a driving or braking force of the wheel;
   a self-aligning torque estimating unit that estimates self-aligning torque generated in the wheel on the basis of the steering factor detected by the steering factor detecting unit, estimates a quantity of influence of the driving or braking force estimated by the longitudinal force estimating unit on the self-aligning torque, and estimates a value obtained by removing the quantity of influence from the self-aligning torque as new self-aligning torque;
   a vehicle state variable detecting unit that detects a state variable of the vehicle;
   a wheel factor estimating unit that estimates at least one of wheel factors including side force and slip angle applied on the wheel on the basis of the state variable detected by the vehicle state variable detecting unit;

a grip factor estimating unit that estimates a grip factor of the wheel on the basis of change of the self-aligning torque newly estimated by the self-aligning torque estimating unit relative to the wheel factor estimated by the wheel factor estimating unit; and a control unit that controls at least one of braking force, engine output and gear shift position of the vehicle to reduce a speed of the vehicle when the grip factor estimated by the grip factor estimating unit is lower than a predetermined value.

8. The vehicle motion control apparatus according to claim 7, further comprising a reference self-aligning torque setting unit that sets reference self-aligning torque on the basis of the wheel factor estimated by the wheel factor estimating unit and the self-aligning torque estimated by the self-aligning torque estimating unit, wherein the grip factor estimating unit estimates the grip factor of the wheel on the basis of a result of comparison between the reference self-aligning torque set by the reference self-aligning torque setting unit and the self-aligning torque estimated by the self-aligning torque estimating unit.

9. The vehicle motion control apparatus according to claim 8, wherein the reference self-aligning torque setting unit sets a reference self-aligning torque characteristic obtained by approximating characteristic of the self-aligning torque estimated by the self-aligning torque estimating unit relative to the wheel factor estimated by the wheel factor estimating unit linearly including an origin, and wherein the reference self-aligning torque setting unit sets the reference self-aligning torque on the basis of the reference self-aligning torque characteristic.

10. The vehicle motion control apparatus according to claim 8, wherein the reference self-aligning torque setting unit sets a linear reference self-aligning torque characteristic having a gradient set on the basis of a brush model for the wheel, and wherein the reference self-aligning torque setting unit sets the reference self-aligning torque on the basis of the linear reference self-aligning torque characteristic.

11. The vehicle motion control apparatus according to claim 7, wherein the control unit controls braking force applied to at least one wheel of the vehicle to be not lower than a predetermined braking force irrespective of a braking operation of a driver of the vehicle, when the grip factor estimated by the grip factor estimating unit is lower than the predetermined value during the braking operation.

12. The vehicle motion control apparatus according to claim 11, wherein the control unit sets the predetermined braking force on the basis of at least one of the quantity of operation of a braking pedal in the vehicle, the grip factor, the friction coefficient of a road surface for the wheel and a load imposed on the wheel.

13. The vehicle motion control apparatus according to claim 12, wherein the control unit controls to prohibit braking force for a wheel in a rear of the vehicle from increasing when the friction coefficient of the road surface is lower than a predetermined value.

14. The vehicle motion control apparatus according to claim 11, wherein the control unit judges on the basis of the vehicle state detected by the vehicle state variable detecting unit as to whether the vehicle is in a state having a tendency to under-steer or a tendency to over-steer, and wherein the control unit controls the braking force to change yaw moment generated in the vehicle in accordance with the judgment as to whether the vehicle is in a state having a tendency to under-steer or a tendency to over-steer.

* * * * *